(12) United States Patent
Ikeda et al.

(10) Patent No.: US 12,106,002 B2
(45) Date of Patent: Oct. 1, 2024

(54) DISPLAY APPARATUS CAPABLE OF DISPLAYING SLIDE SHOW, METHOD FOR CONTROLLING THE SAME, AND STORAGE MEDIUM

(71) Applicant: CANON KABUSHIKI KAISHA, Tokyo (JP)

(72) Inventors: Atsushi Ikeda, Ibaraki (JP); Takeshi Kogure, Ibaraki (JP); Hiroaki Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/055,748

(22) Filed: Nov. 15, 2022

(65) Prior Publication Data

US 2023/0153050 A1   May 18, 2023

(30) Foreign Application Priority Data

Nov. 18, 2021   (JP) .................................. 2021-187836
Dec. 10, 2021   (JP) .................................. 2021-200578
Dec. 10, 2021   (JP) .................................. 2021-200581
Aug.  1, 2022   (JP) .................................. 2022-122645

(51) Int. Cl.
*G06F 3/048*       (2013.01)
*G06F 3/0482*      (2013.01)
*G06F 3/04847*     (2022.01)
*G06F 3/0486*      (2013.01)
*G06F 3/14*        (2006.01)
(Continued)

(52) U.S. Cl.
CPC .............. *G06F 3/14* (2013.01); *G06F 3/0482* (2013.01); *G06F 3/04847* (2013.01); *G06F 3/0486* (2013.01); *G06T 11/60* (2013.01); *H04N 1/00408* (2013.01); *H04N 2201/0094* (2013.01)

(58) Field of Classification Search
CPC ...... G06F 3/14; G06F 3/0482; G06F 3/04847; G06F 3/0486; G06T 11/60; H04N 1/00408; H04N 2201/0094
See application file for complete search history.

(56) References Cited

U.S. PATENT DOCUMENTS

2003/0158909 A1 *   8/2003   Simpson ................. G06F 16/50
                                                        715/733
2004/0012809 A1 *   1/2004   Appling, III ....... H04N 1/00198
                                                         358/1.15
(Continued)

FOREIGN PATENT DOCUMENTS

JP   2003163919 A   6/2003
JP   2008035381 A   2/2008
(Continued)

*Primary Examiner* — Aleksey Olshannikov
(74) *Attorney, Agent, or Firm* — Canon U.S.A., Inc. I.P. Division

(57) ABSTRACT

A display apparatus that displays an image acquired via a network, the display apparatus includes a display unit configured to display information, and one or more controllers configured to register a plurality of pieces of address information including address information for image data accessible with a first protocol and address information for image data accessible with a second protocol, and acquire a plurality of pieces of image data based on the plurality of pieces of registered address information and sequentially display the plurality of pieces of acquired image data on the display unit.

24 Claims, 34 Drawing Sheets

(51) Int. Cl.
    *G06T 11/60*     (2006.01)
    *H04N 1/00*     (2006.01)

(56) References Cited

U.S. PATENT DOCUMENTS

| | | | | |
|---|---|---|---|---|
| 2008/0288890 A1* | 11/2008 | Anderson | ........... | H04N 21/4788 |
| | | | | 715/810 |
| 2009/0044136 A1* | 2/2009 | Flider | ................. | G11B 27/10 |
| | | | | 715/764 |
| 2010/0064223 A1* | 3/2010 | Tilton | ................ | G06F 16/4393 |
| | | | | 715/732 |
| 2011/0231745 A1* | 9/2011 | Levesque | ............. | G06F 16/487 |
| | | | | 715/202 |
| 2016/0062576 A1* | 3/2016 | Simon | ................. | G06F 3/0482 |
| | | | | 715/731 |
| 2018/0350130 A1* | 12/2018 | Westerhoff | .......... | A61B 5/7475 |

FOREIGN PATENT DOCUMENTS

| | | |
|---|---|---|
| JP | 2015524114 A | 8/2015 |
| JP | 2016187098 A | 10/2016 |

\* cited by examiner

FIG.6

NOTIFICATION DISPLAY (SERVER)

REGISTERING A NEW SLIDE

IMAGES EXCEEDING 800 * 480 PIXELS CANNOT BE DISPLAYED.

609 — [ OK ]   610 — [ CANCEL ]

DETAILED SLIDE INFORMATION

611 — [ CHECK CONNECTION ]

BACKGROUND:
- ● SPECIFY IMAGE WITH PATH
- ○ SPECIFY IMAGE WITH URL
- ○ SPECIFY COLOR (602)

FILE LOCATION: [_____] (UP TO 256 CHARACTERS) — 603

* EXAMPLE INPUT:
\\server\foldername1\foldername2\filename.jpg

USER NAME: [_____] — 604

☐ SET/CHANGE PASSWORD

PASSWORD: [_____] — 605

BACKGROUND COLOR: [ BLACK ▼ ] — 606

☐ DISPLAY TEXT ON SLIDE — 607

* SOME TEXT STRINGS MAY NOT BE DISPLAYED DEPENDING ON COMBINATION OF THE FOLLOWING SETTINGS:

TEXT TO BE DISPLAYED: [_____] (UP TO 50 CHARACTERS)
FONT: [ NORMAL ▼ ]
FONT SIZE: [ MIDDLE ▼ ]
FONT COLOR: [ WHITE ▼ ]
SCROLLING TEXT SPEED: [ NORMAL ▼ ]
SCROLL DIRECTION: [ DO NOT SCROLL ▼ ]

```
{
    "buttonName":"NOTIFICATION DISPLAY (SERVER)", ~2004
    "folderSetting":{
        "folderPath":"\\\\server1\\folder1\\folder2", ~2005
        "username":"UserA", ~2006
        "isPasswordSet":true, ~2007
        "password":"Rkl+o7G", ~2008
        "fileOrder":"name" ~2009
    },
    "slides":[
        {
            "picture":{
                "background":"path", ~2010     2011
                "path":"\\\\server1\\folder1\\folder2\\picture01.jpg",
                "imagename":"picture01.jpg", ~2012
                "username":"UserA", ~2013
                "setPassword":true, ~2014
                "password":"Rkl+o7G", ~2015
                "bgcolor":0 ~2016
            },
            "textstyle":{
                "enabletext":true, ~2017
                "text":"picture01.jpg OF SERVER 1", ~2018
                "fontStyle":0, ~2019
                "fontSize":2, ~2020
                "fontColorRGB":65280, ~2021
                "scrollAmount":2, ~2022
                "scrollDirection":0 ~2023
            }
        },
        .
        .
        .
    ],
    "slideMethod":"image", ~2025
    "slideTime":2 ~2026
}
ENDOFSETTING
```

FIG.20B

| ☐ | DISPLAY ORDER | BACKGROUND | TEXT TO BE DISPLAYED | PATH INFORMATION |
|---|---|---|---|---|
| ☐ | 1 | picture01.jpg | picture01.jpg OF SERVER 1 | \\server1\folder1\folder2\ |
| ☐ | 2 | samp01.png | samp01.png OF SERVER 2 | \\server2\folderA\folderB\ |
| ☐ | 3 | picture03.jpg | picture03.jpg OF SERVER 1 | \\server1\folder1\folder2\ |
| ☐ | 4 | picture09.jpg |  | \\server1\folder1\folder2\ |
| ☐ | 5 | view02.jpg | view02.jpg OF SERVER 3 | http://server3/folder3/ |

NOTIFICATION DISPLAY (SERVER)
EDITING DISPLAY ORDER
OK  CANCEL
SLIDE MANAGEMENT
REGISTERED SLIDES
MOVE UP  MOVE DOWN

FIG.23

| DISPLAY ORDER | BACKGROUND | FILE LOCATION | USER NAME | SET/CHANGE PASSWORD | PASSWORD | BACKGROUND COLOR | DISPLAY TEXT ON SLIDE | TEXT TO BE DISPLAYED | FONT | FONT SIZE | FONT COLOR | SCROLLING TEXT SPEED | SCROLL DIRECTION |
|---|---|---|---|---|---|---|---|---|---|---|---|---|---|
| 1 | SPECIFY IMAGE WITH PATH | \\server1\folder1\folder2\picture01.jpg | USER A | ON | PassA | BLACK | ON | picture01.jpg OF SERVER 1 | NORMAL | MIDDLE | WHITE | NORMAL | DO NOT SCROLL |
| 2 | SPECIFY IMAGE WITH PATH | \\server2\folderA\folderB\samp01.png | USER A | ON | PassA | RED | ON | samp01.png OF SERVER 2 | BOLD | LARGE | YELLOW | SLOW | FROM RIGHT TO LEFT |
| 3 | SPECIFY IMAGE WITH PATH | \\server1\folder1\folder2\picture09.jpg | USER A | ON | PassA | YELLOW | OFF | | | | | | |
| 4 | SPECIFY IMAGE WITH URL | http://server3/folder3/view02.jpg | USER A | ON | PassA | BLACK | ON | view02.jpg OF SERVER 3 | NORMAL | MIDDLE | WHITE | NORMAL | FROM BOTTOM UPWARD |
| 5 | SPECIFY IMAGE WITH PATH | \\server1\folder1\folder2\picture03.jpg | USER A | ON | PassA | BLUE | ON | picture03.jpg OF SERVER 1 | NORMAL | MIDDLE | BLUE | NORMAL | FROM TOP DOWNWARD |

NOTIFICATION DISPLAY (SERVER)

EDITING BASIC SETTINGS

WHEN [SPECIFY SLIDES ONE BY ONE] IS SELECTED FOR [SLIDE SPECIFICATION METHOD], SLIDE DISPLAY ORDER CAN BE EDITED AND TEXT CAN BE INSERTED FROM [SLIDE MANAGEMENT]. WHEN [COLLECTIVELY SPECIFY SLIDES FROM FOLDER] IS SELECTED FOR [SLIDE SPECIFICATION METHOD], UP TO 20 FILES ARE DISPLAYED.
IMAGES EXCEEDING 800 * 480 PIXELS CANNOT BE DISPLAYED.

30506 — [ OK ]   30507 [ CANCEL ]

BASIC SETTINGS

30502
☐ CHANGE BUTTON NAME
  BUTTON NAME: [_____] (UP TO 20 CHARACTERS)
☐ AUTOMATICALLY MAKE TRANSITION   30503

* VALUE SET AS AUTO CLEAR TRANSITION TIME IN [REMOTE UI]-[SET TIMER] IS REFLECTED TO TRANSITION TIME.

DISPLAY TIME FOR ONE SLIDE: [____] SECONDS (1 - 30) — 30504

SLIDE SPECIFICATION METHOD: ● COLLECTIVELY SPECIFY SLIDES FROM FOLDER
                            ○ SPECIFY SLIDES ONE BY ONE    30505

SLIDE IMAGE ERROR HANDLING METHOD:
  ○ DO NOT DISPLAY SLIDE
  ● DISPLAY ONLY TEXT STRING
  ○ DISPLAY ALTERNATIVE IMAGE AND TEXT STRING   30508
  ○ DISPLAY ONLY ALTERNATIVE IMAGE
  ○ DISPLAY BLANK

ALTERNATIVE IMAGE SELECTION METHOD:
  ○ USE DEFAULT IMAGE
  ○ USE REGISTERED IMAGE   30509
                                        30510
  ☐ REGISTER ALTERNATIVE IMAGE
  [_____] [ REFER TO... ]

FIG.25

| SLIDE NO. | TEXT STRING | PROTOCOL | IMAGE PATH |
|---|---|---|---|
| 1 | test1 | SMB | \\server1\dir1\path\image1.jpg |
| 2 | test2 | SMB | \\server2\dir2\path\image2.jpg |
| 3 | test3 | SMB | \\server3\dir3\path\image3.jpg |
| 4 | test4 | SMB | \\server1\dir1\path\image1.jpg |

| PROTOCOL | IMAGE PATH | SIZE | DATE AND TIME OF UPDATE |
|---|---|---|---|
| SMB | \\server1\dir1\path\image1.jpg | 10000 | JAN. 1, 2021 |
| SMB | \\server2\dir2\path\image2.jpg | 20000 | FEB. 1, 2021 |
| SMB | \\server3\dir3\path\image3.jpg | 30000 | MAR. 1, 2021 |

*316-01*  *316-02*  *316-03*  *316-04*

FIG.28
318-01
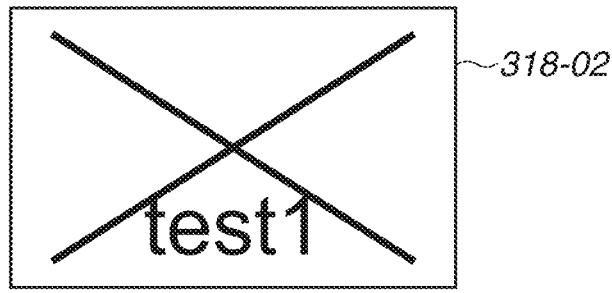
318-02
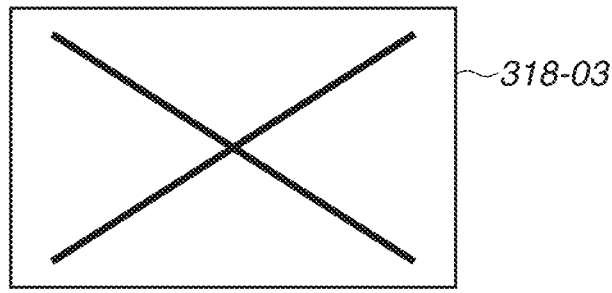
318-03
318-04

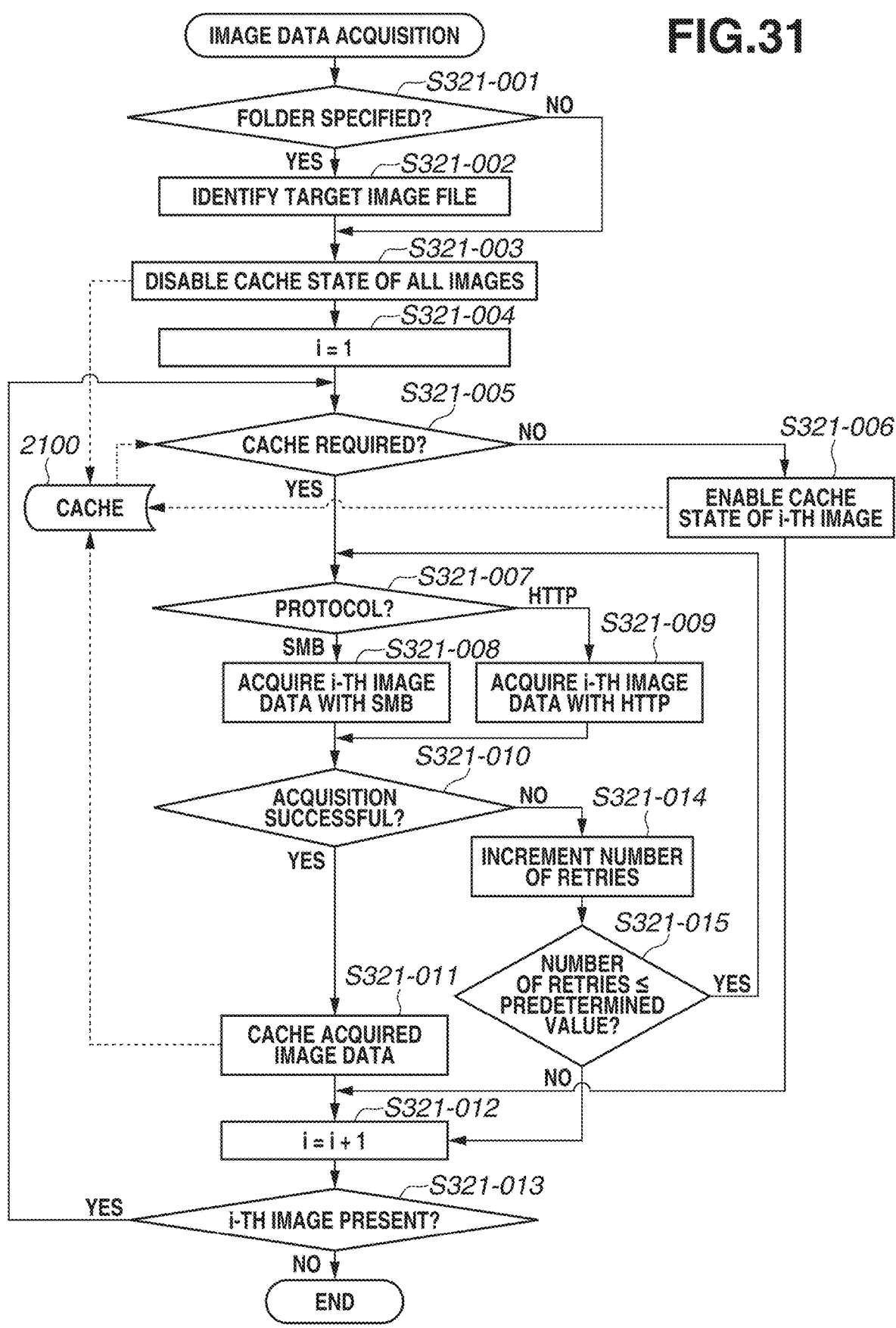

DISPLAY APPARATUS CAPABLE OF DISPLAYING SLIDE SHOW, METHOD FOR CONTROLLING THE SAME, AND STORAGE MEDIUM

BACKGROUND

Field of the Disclosure

The present disclosure generally relates to information processing and, more particularly, to an information processing system capable of displaying photographic images as a slide show on a display unit. Examples of apparatuses applicable to the information processing system include business machines such as copying machines, printers, scanners, facsimiles, and Multi Function Peripherals (MFPs) as well as general information processing apparatuses such as personal computers (PCs) and mobile terminals.

Description of the Related Art

An apparatus such as a digital photo frame is known to provide a slide show using image files stored in a storage such as a Universal Serial Bus (USB) memory or a Secure Digital (SD) card. In these days, there have been released some products of image processing apparatuses (information processing apparatuses), such as MFPs, having such a slide show function.

Japanese Unexamined Patent Application Publication No. 2015-524114 discusses a digital signage system that implements slide shows having the same contents on a plurality of display devices by delivering slide show information from a management service (distribution server) to the plurality of display devices.

SUMMARY

Prior arts including that in Japanese Unexamined Patent Application Publication No. 2015-524114 have a room of improvement in a method for acquiring target images for a slide show. These prior arts are configured to perform a slide show using images collected at one location such as an internal storage (including a Secure Digital (SD) card and a Universal Serial Bus (USB) memory) or a distribution server, and therefore cannot support a slide show using images existing in a plurality of locations.

The present disclosure is directed to providing a display apparatus capable of performing a slide show using image data existing in a plurality of locations.

According to an aspect of the present disclosure, a display apparatus that displays an image acquired via a network, the display apparatus includes a display unit configured to display information, and one or more controllers configured to register a plurality of pieces of address information including address information for image data accessible with a first protocol and address information for image data accessible with a second protocol, and acquire a plurality of pieces of image data based on the plurality of pieces of registered address information and sequentially display the plurality of pieces of acquired image data on the display unit.

Further features of the present disclosure will become apparent from the following description of exemplary embodiments with reference to the attached drawings.

BRIEF DESCRIPTION OF THE DRAWINGS

FIG. 6 illustrates an example of a new slide registration screen.
FIG. 18 illustrates an example of setting data stored in a slide setting area illustrated in FIG. 15.
FIG. 20B illustrates an example display in a second process of the display order editing screen.
FIG. 23 illustrates examples of setting values for each slide registered in the new slide registration screen.
FIG. 24 illustrates an example of a basic setting editing screen.
FIG. 25 illustrates an example of slide registration information maintained in the extended application.
FIG. 26 illustrates an example of meta information maintained in the extended application.
FIG. 28 illustrates examples of alternative slides.

FIG. 31 is a flowchart illustrating the processing for acquiring slide show image data in the extended application.

DESCRIPTION OF THE EMBODIMENTS

Exemplary embodiments of the present disclosure will be described in detail below with reference to the accompanying drawings. The following exemplary embodiments do not limit the present disclosure within the ambit of the appended claims. Not all of the combinations of the configurations and processes described in the exemplary embodiments are indispensable to the solutions for the present disclosure. Equivalents may be substituted for a part or whole of the configurations and processes described in the exemplary embodiments. In addition, a part of the configurations and processes may be omitted.

<System>

Exemplary embodiments will be described below. A first present exemplary embodiment will be described below centering on a system dedicated for an environment where there is a demand for a slide show using images existing in a plurality of locations, on one Multi Function Peripheral (MFP) or image forming apparatus.

Figure 1:
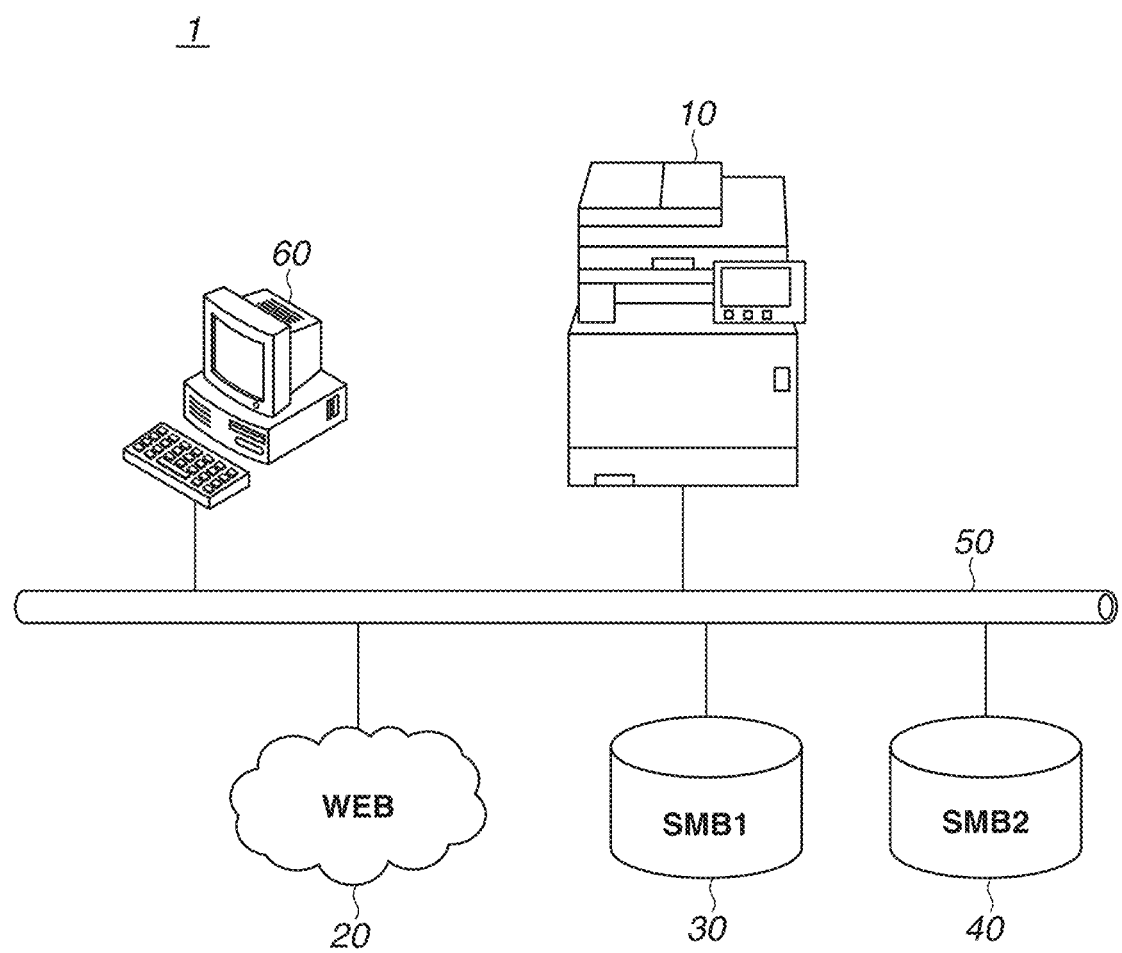
FIG. 1 illustrates an example of a network configuration.

Assume an example case where, in a university having a large campus, common guidance information is displayed in the display unit of each of MFPs installed in a plurality of office work windows in some university buildings. The common guidance information may include introductions of various circles. The example will be considered below focusing on an MFP having a function of reading data from an internal storage. To enable each MFP to display common guidance information, all of image data generated by each circle needs to be stored in the internal storages of all MFPs. If a certain circle needs to replace an image in the contents of the guidance information, the relevant image is stored in all MFPs in a plurality of university buildings, which is very troublesome. Meanwhile, a method for implementing the same operation by using a digital signage that receives data distributed from a distribution server will be considered below. In this case, registering and storing the target image only in the distribution server eliminates the need of storing the target image in all of digital signages in a plurality of university buildings. However, a circle member who wants to replace an image needs to register the relevant image in the distribution server. From the viewpoint of security, only a specific server administrator is permitted to operate the distribution server in many cases. In this case, the circle member needs to pass the image to the server administrator, and then the server administrator needs to register and store the image in the distribution server. It is easily conceivable that these procedures take a lot of time. Therefore, for example, the system is configured to provide a slide show by combining images stored in a server that can be operated only by a server administrator with images stored in a server that can be operated by any user other than a server administrator. This configuration enables editing the contents of the slide show in a flexible way. The system according to the first exemplary embodiment will be described below. FIG. 1 illustrates an example of a system configuration.

As illustrated in FIG. 1, in a display system 1 according to the present exemplary embodiment, an MFP 10, a web server 20, a file server (Server Message Block (SMB) 1) 30, a file server (SMB 2) 40, and an information processing apparatus 60 are connected with each other via a network circuit 50. The MFP 10 is an image processing apparatus (information processing apparatus) that functions as an image forming apparatus for forming an image on a sheet and an image reading apparatus for reading a document. The MFP 10 functions as a display apparatus for displaying information. The web server 20, the file server (SMB 1) 30, and the file server (SMB 2) 40 are general servers. The information processing apparatus 60 is a general information processing apparatuses such as a personal computer (PC).

Each of the web server 20, the file server (SMB 1) 30, the file server (SMB 2) 40, and the information processing apparatus 60 includes a central processing unit (CPU), a read only memory (ROM), a random-access memory (RAM), and a storage. Each of these apparatuses operates when the CPU, which includes one or more processors, circuitry, or combinations thereof, loads a program stored in the ROM and the storage into the RAM, and then executes the program. Each of the web server 20, the file server (SMB 1) 30, the file server (SMB 2) 40, and the information processing apparatus 60 further includes a network interface (I/F) to enable communication with the MFP 10. The MFP 10 can acquire data on the web server 20 through the hypertext transfer protocol (http). Likewise, the MFP 10 can acquire data on the file server (SMB 1) 30 and the file server (SMB 2) 40 through the SMB protocol. Then, the MFP 10 can display the acquired data on the display unit provided on the MFP 10. In particular, by executing an extended application 310, the MFP 10 according to the present exemplary embodiment can collect images existing in a plurality of locations and provide a slide show. The extended application 310 will be described in detail below. Although, in this example, only one MFP 10 is connected to the network circuit 50 to simplify descriptions, a plurality of the MFPs 10 may be connected to the network circuit 50. An image slide show may be performed by each MFP 10. As used herein, the term "unit" generally refers to software, firmware, hardware, circuitry, or combinations thereof that is used to effectuate a purpose.

<Sequence of Using the System>

Figure 12:
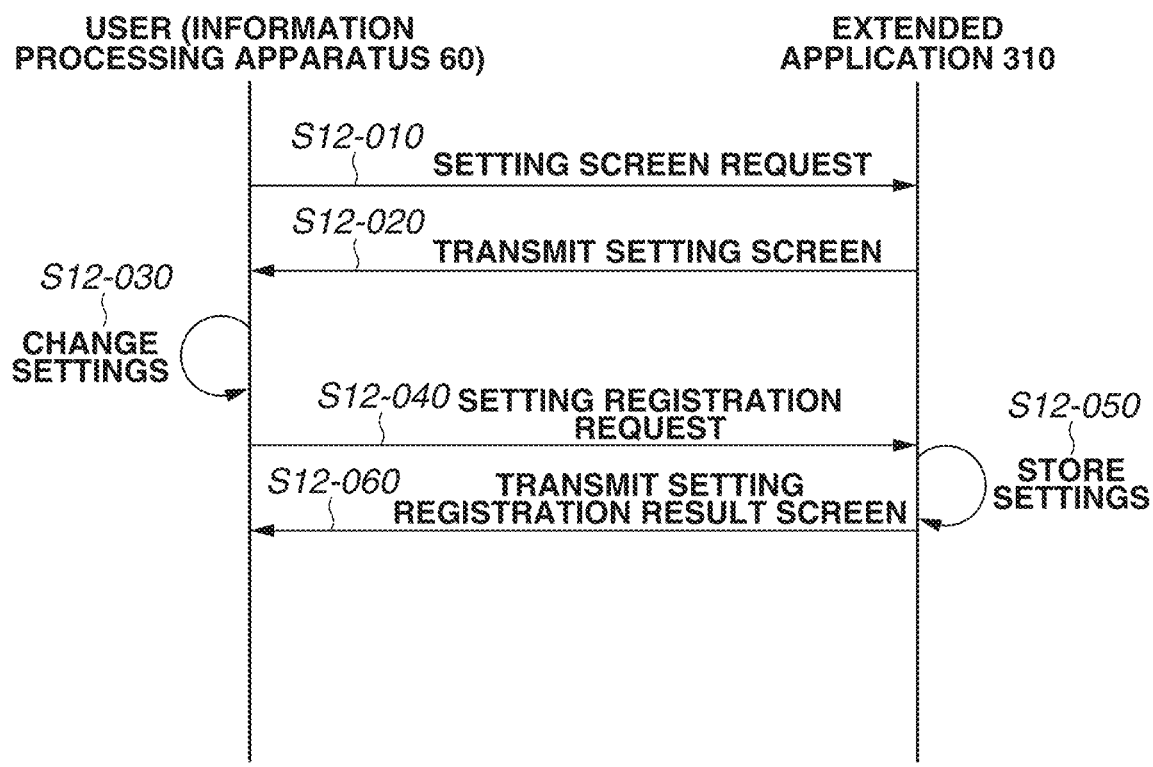
FIG. 12 illustrates a sequence for performing setting of the extended application.

When the user uses the extended application 310 in the MFP 10, the user first performs setting processing. FIG. 12 illustrates a sequence of performing setting of the extended application 310. In step 12-010 (hereinafter, referred to as step S12-010), the user issues a setting screen request to the extended application 310 from the web browser operating on the information processing apparatus 60 connected with the MFP 10 via the network circuit 50. The extended application 310 has a server function of providing an external apparatus with a web page (Hyper Text Markup Language (HTML) data). Upon reception of the setting screen request from the web browser operating on the information processing apparatus 60, then in step S12-020, the extended application 310 transmits a top screen 401 of setting screens of the extended application 310 to the web browser. In step S12-030, the user performs application setting. In step S12-040, the user transmits a setting registration request to the extended application 310. In step S12-050, the setting contents transmitted by the setting registration request in step S12-040 are stored in an embedded Multi Media Card (eMMC) 109. In step S12-060, the extended application 310 transmits a setting registration result screen to the web browser. This completes the setting processing.

Figure 13:
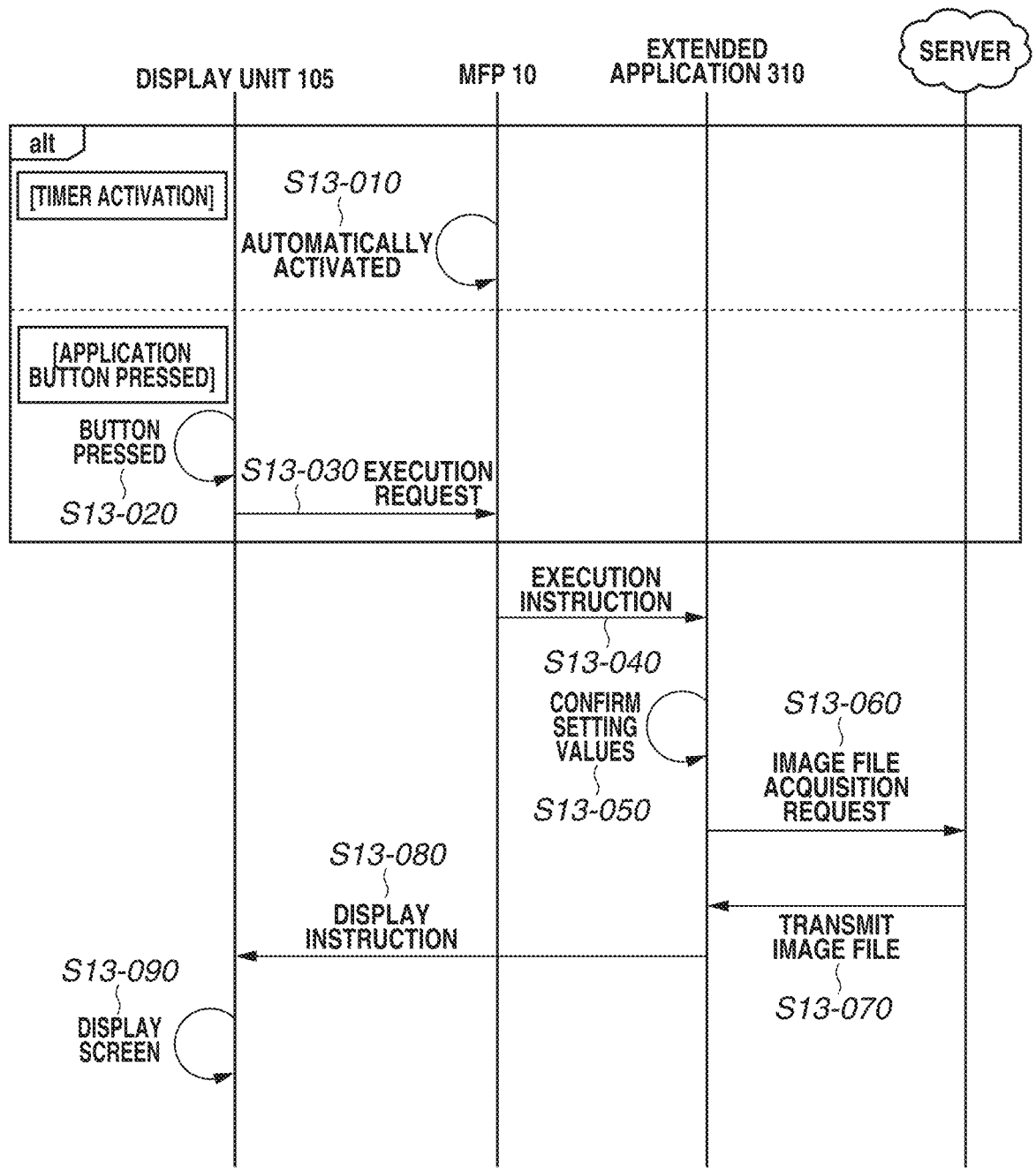
FIG. 13 illustrates a sequence for executing the extended application.

Upon completion of the above-described setting processing, the extended application 310 becomes ready to be used. FIG. 13 illustrates a sequence for executing the extended application 310. When the user performs setting with an automatic application start setting ("Automatically Make Transition") option 503 in a basic setting editing screen 501 (described below), then in step S13-010, the activation timing is detected based on the settings. In step S13-040, the MFP 10 issues an execution instruction to the extended application 310. This execution instruction can be issued even if the activation timing is not detected in step S13-010. When the user presses an extended application start button 1106 displayed on a display unit 105 of the MFP 10 in step S13-020, then in step S13-030, the display unit 105 issues an application execution request to the MFP 10. When the activation timing is detected in step S13-010 or when the application execution request is issued in step S13-030, then in step S13-040, the MFP 10 issues an execution instruction to the extended application 310. Upon reception of the execution instruction, then in step S13-050, the extended application 310 confirms the setting values from the eMMC 109. In step S13-060, the extended application 310 issues an image file acquisition request to servers such as the web server 20, the file server (SMB 1) 30, and the file server (SMB 2) 40 according to the setting values confirmed in step S13-050. In step S13-070, the server transmits an image file to the extended application 310. Upon reception of the image file from the server, then in step S13-080, the extended application 310 issues a display instruction to the display unit 105. In step S13-090, the display unit 105 displays the image file received from the server according to the setting values confirmed in step S13-050. The basic operations for image display are performed in this way.

Figure 14:
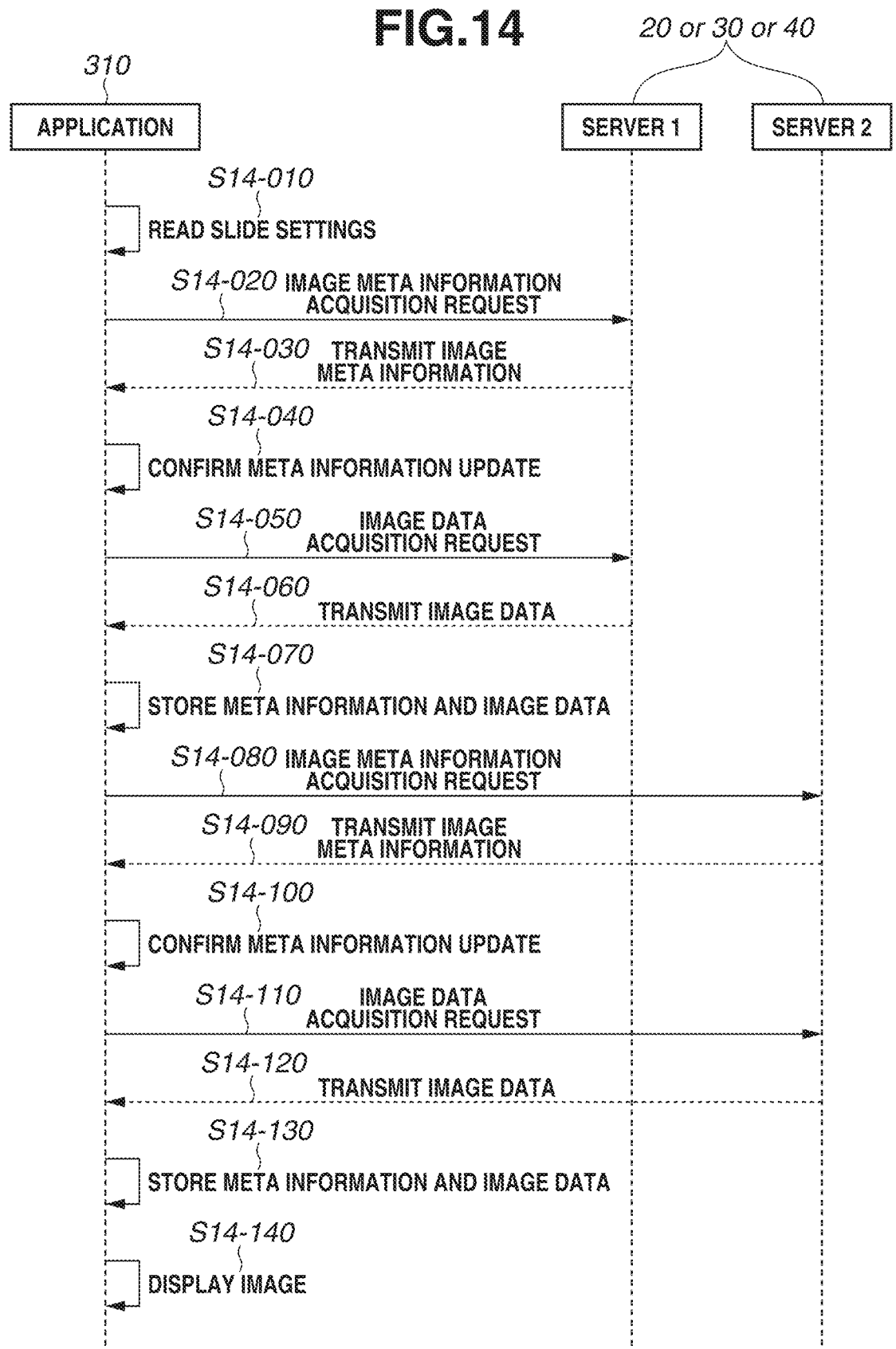
FIG. 14 is a sequence diagram illustrating processing between the extended application and a server.

Operations of the extended application 310 performed when acquiring images from a plurality of servers will be described below. FIG. 14 is a sequence diagram illustrating processing between the extended application 310 and servers. In step S14-010, the extended application 310 reads slide setting information to recognize the contents of the information. From the following step on, the extended application 310 performs processing for acquiring images from a registered server based on the slide setting information. A case where two different slides are set will be described below. In step S14-020, the extended application 310 issues an image meta information acquisition request to the server 1 registered in the first slide in the slide setting information. The image meta information refers to information about the date and time of update and the size of a predetermined image. In step S14-030, the server 1 that received the request in step S14-020 transmits predetermined image meta information. In step S14-040, the extended application 310 compares the image meta information received in step S14-030 and the prestored image meta information to confirm whether the two meta information pieces are different. When the two meta information pieces are different, the extended application 310 performs steps S14-050 to S14-070. On the other hand, when the two meta information pieces are identical, the extended application 310 performs step S14-080 and subsequent steps to acquire the next slide image since the slide image acquisition is unnecessary. In step S14-050, the extended application 310 issues an image data acquisition request to the server 1 registered in the slide setting information. In step S14-060, the server 1 that received the request transmits predetermined image data. The communication between the extended application 310 and the servers is performed based on the protocol type registered in the slide setting information. For example, when the protocol type is SMB, the SMB protocol is used. When the protocol type is http, the http protocol is used. In step S14-070, the extended application 310 stores the image meta information and the image data acquired in steps S14-030 and S14-060, respectively, in the image forming apparatus. The stored image meta information is used as "prestored image meta information" in step S14-040 for the next time. The extended application 310 performs steps S14-080 to S14-130 on information registered in the second slide in the slide setting information. These steps are the same as steps S14-020 to S14-070 for the first slide, redundant descriptions thereof will be omitted. In step S14-140, the extended application 310 displays each slide based on the image data acquired from the server.

<MFP>

Figure 2:
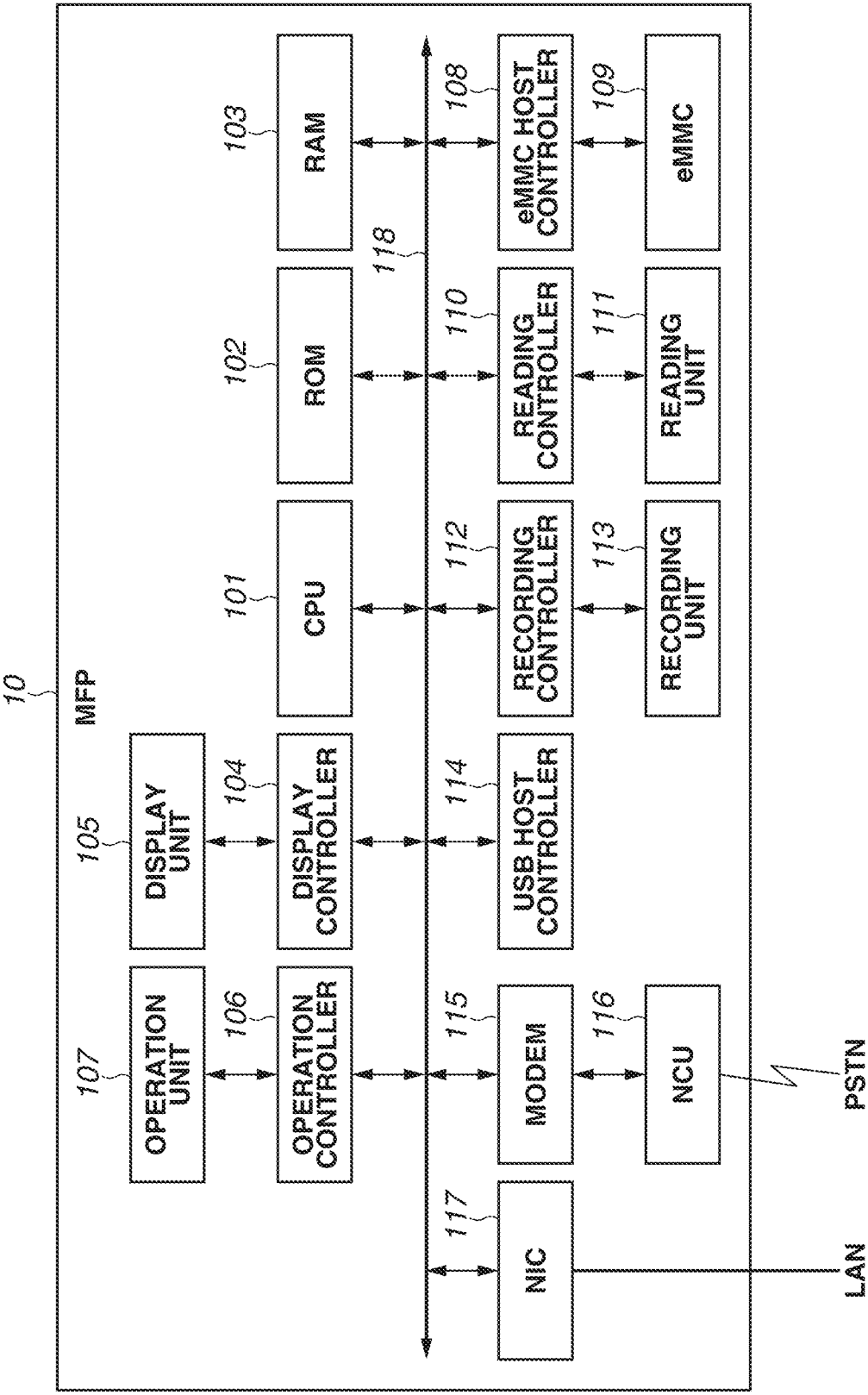
FIG. 2 is a block diagram illustrating a hardware configuration of a Multi Function Peripheral (MFP).

FIG. 2 is a block diagram illustrating a hardware configuration of an MFP. As illustrated in FIG. 2, the MFP 10 includes a CPU 101, a ROM 102, a RAM 103, a display controller 104, a display unit 105, an operation controller 106, and an operation unit 107. The MFP 10 further includes an eMMC host controller 108, an eMMC 109, a reading controller 110, a reading unit 111, a recording controller 112, and a recording unit 113. The MFP 10 further includes a Universal Serial Bus (USB) host controller 114, a MODEM 115, a Network Control Unit (NCU) 116, and a Network Interface Card (NIC) 117.

The CPU 101 is a control unit (processor or controller) that totally controls each device connected to a system bus 118. When power is turned ON, the CPU 101 executes the boot program stored in the ROM 102. Normally, the boot program loads the main program stored in a storage into the RAM 103 and then transfers control to the top of the loaded main program. The RAM 103 functions not only as a location for loading the main program but also as a work area for the main program. The CPU 101 implements processing in FIGS. 15 to 17 (described below) by executing control programs described below with reference to FIGS. 15 to 17.

The display controller 104 is a display control unit (controller) that controls image drawing on the display unit 105. For example, the display unit 105 is a full bitmap Liquid Crystal Display (LCD) having the Wide Video Graphics Array (WVGA) size. On the other hand, the operation controller 106 is an operation control unit (controller) that controls inputs from the operation unit 107 provided on the MFP 10. The operation unit 107 includes a touch panel stacked on the display unit 105 and is capable of detecting user's touch operations.

The reading unit 111 is configured to read a document and includes a line sensor and a camera. The reading unit 111 is a device that drives and uses the line sensor and the camera. The reading unit 111 is attached with an automatic document feeder (not illustrated) as an option and is capable of automatically reading a plurality of documents. The reading unit 111 is connected to the reading controller 110. The CPU 101 communicates with the reading unit 111 via the reading controller 110.

The recording unit 113 is an image forming unit that forms an image on recording paper through an electrophotographic method. The recording unit 113 is connected to the recording controller 112. The CPU 101 communicates with the recording unit 113 via the recording controller 112.

The USB host controller 114 takes charge of USB protocol control and mediates access to a USB device such as a USB memory (not illustrated).

The MODEM 115 is configured to modulate and demodulate signals for facsimile communication.

The MODEM 115 is connected to the NCU 116. A signal modulated by the MODEM 115 is sent to Public Switched Telephone Networks (PSTN) via the NCU 116.

The NIC 117 bi-directionally exchanges data with a mail server and a file server via a LAN.

The MFP 10 according to the present exemplary embodiment includes the eMMC 109 as a storage. A Solid State Drive (SSD) and a Hard Disk Drive (HDD) may be used instead of the eMMC 109. The CPU 101 accesses the eMMC 109 via the eMMC host controller 108.

Figure 3:
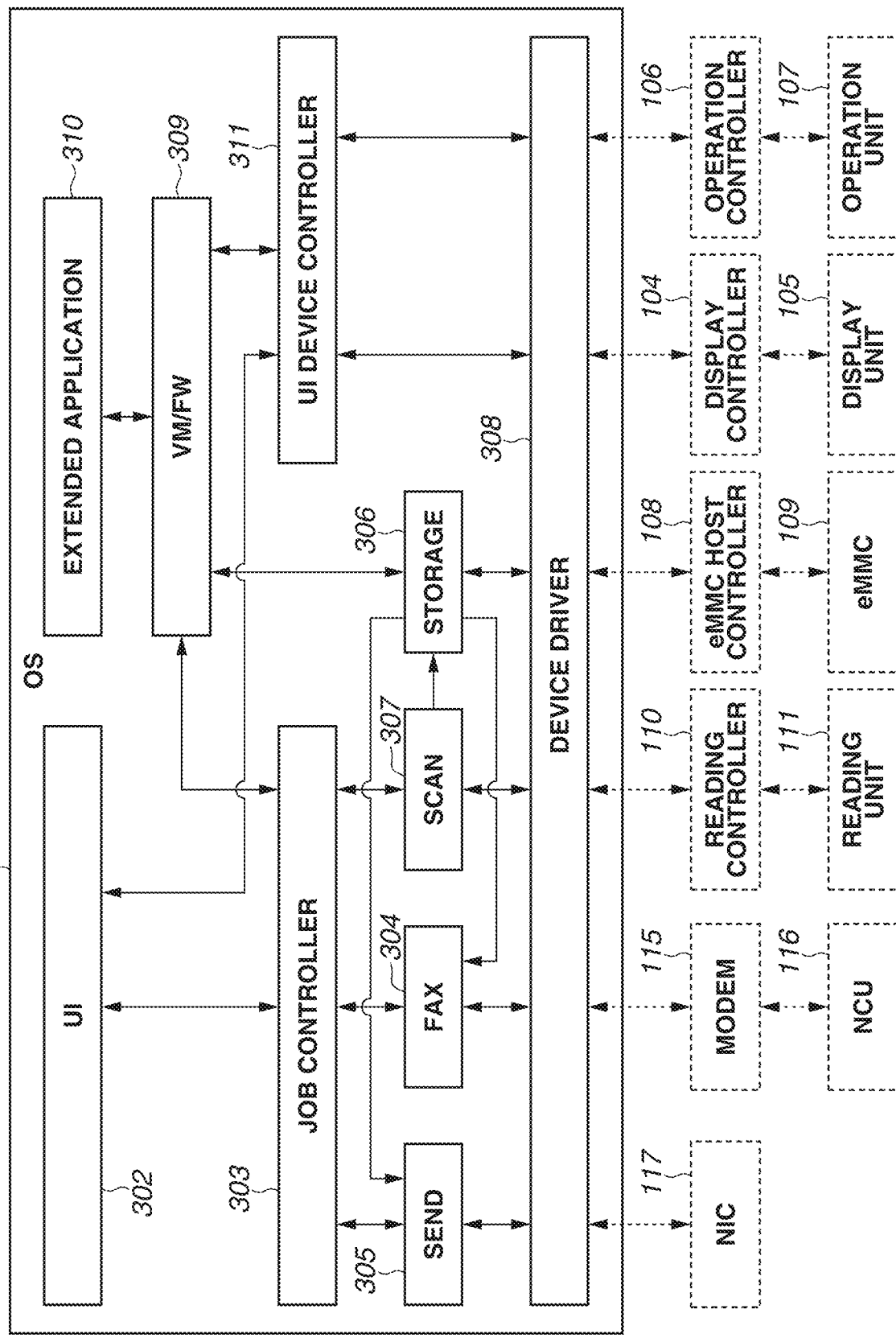
FIG. 3 illustrates a software configuration of the MFP.

FIG. 3 illustrates a software configuration of the MFP 10. Referring to FIG. 3, the units drawn with solid lines are software modules that are implemented when the CPU 101 executes the main program loaded into the RAM 103 by the boot program.

The execution of each module (described below) of the main program is managed and controlled by an Operating System (OS) 301. The OS 301 includes a Device Driver 308 that mediates communications with hardware devices including the display controller 104, the operation controller 106, and the reading controller 110.

A User Interface (UI) 302 provides the user with a variety of information via the display unit 105 and the operation unit 107 and accepts various instructions from the user.

A job controller unit 303 accepts jobs including copy, printing, and facsimile jobs and controls the execution of accepted jobs.

A storage unit 306 is a software module that physically stores images transmitted and received by facsimile and user settings in the eMMC 109 and manages these data pieces.

For example, in the MFP 10 according to the present exemplary embodiment, when the job controller unit 303 receives a facsimile job, the scan unit 307 receives the job request and controls the reading unit 111 to scan a document. Then, the scan unit 307 stores the scanned facsimile image data in the storage unit 306. The facsimile image data stored in the storage unit 306 is read by the facsimile unit 304 and then sent to the communication partner by facsimile via the MODEM 115 and the NCU 116. Alternatively, the image data received by facsimile from the communication partner via the MODEM 115 and the NCU 116 is captured by the facsimile unit 304 and then stored in the storage unit 306.

The MFP 10 according to the present exemplary embodiment includes a Virtual Machine (VM)/Framework (FW) unit 309. The extended application 310 includes an arbitrary program described in a script language. Applicable examples of language systems include Java® and Lua as interpreters that interpret and execute byte codes. The VM/FW unit 309 has a role of installing an arbitrary program described in a script language or a predetermined high-level language in the extended application 310 and uninstalling an arbitrary program from the extended application 310. The VM/FW unit 309 also takes charge of mediating between a function implemented by an arbitrary program installed in the extended application 310 and existing functions. The VM/FW unit 309 interprets and executes a described script language. These units enable the MFP 10 according to the present exemplary embodiment to easily implement a login application, slide show, and other arbitrary functions while maintaining the function attachment and detachment property.

A UI Device Controller 311 mediates the output of various kinds of information to the display unit 105 by the UI 302 and the extended application 310, and the transmission of user operations on the operation unit 107 to the UI 302 and the extended application 310. Details will be described below.

Figure 11A:
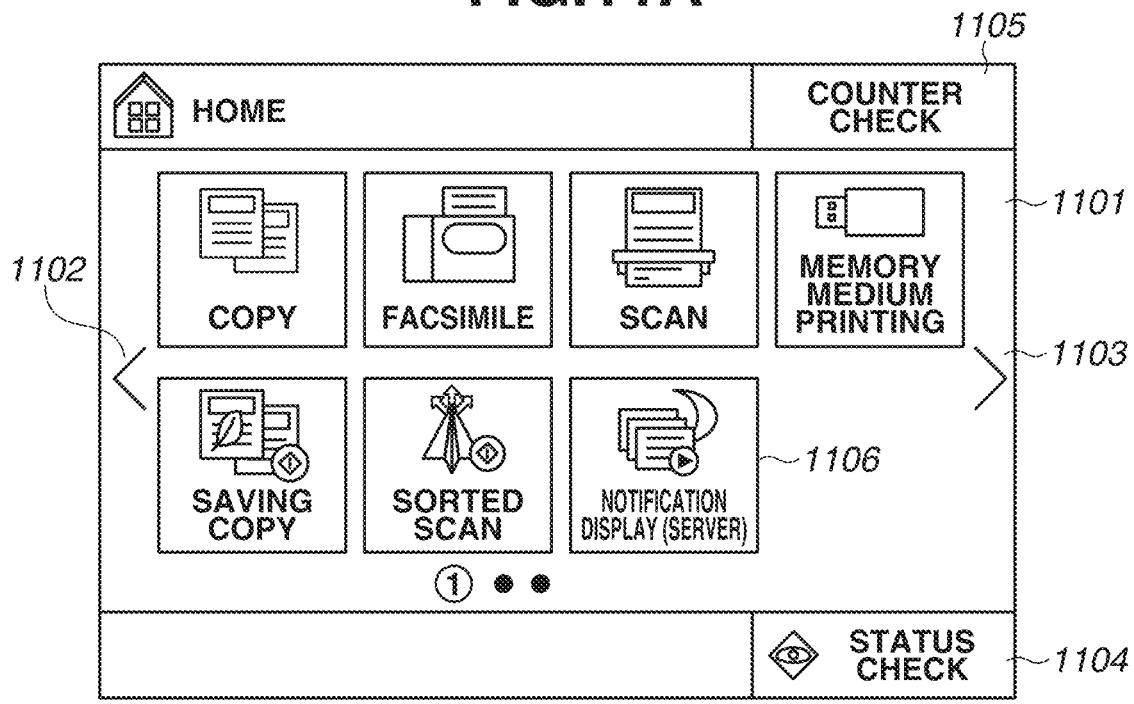
FIG. 11A illustrates extended application start buttons displayed in a display unit of the MFP.
Figure 11B:
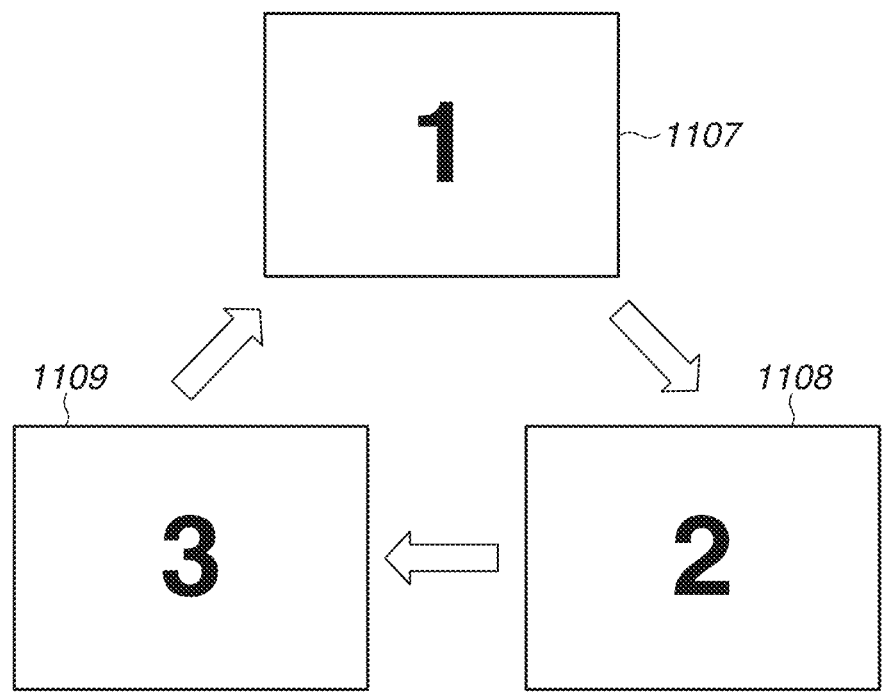
FIG. 11B illustrates examples of application execution screens.

FIG. 11A illustrates examples of extended application start buttons 1106 displayed on the display unit 105 of the MFP 10, and FIG. 11B illustrates examples of application execution screens. The displayed button names of the extended application start buttons 1106 are the button names set in the basic setting editing screen 501. The display unit 105 of the MFP 10 may include a button 1105 that displays a counter check screen for confirming the counter value and a button 1104 that displays a status check screen for confirming job and device statuses. When the user presses an extended application start button 1106 displayed on the display unit 105 of the MFP 10 or the timing set by the automatic application start setting ("Automatically Make Transition") option 503 in the basic setting editing screen 501 comes, the extended application 310 is activated. When the extended application 310 is activated, the extended application 310 displays information on the display unit 105 of the MFP 10 according to the information set in a new slide registration screen 601 or a folder setting editing screen 901.

<Setting Screens>

FIGS. 4 to 10 illustrate examples of setting screens of the extended application 310. These setting screens are displayed on the web browser operating on the information processing apparatus 60 connected with the MFP 10 via the network circuit 50. FIGS. 4 to 10 illustrate examples of setting screens of the extended application 310 that sequentially displays slides including specified image files on the display unit 105 of the MFP 10.

Figure 4:
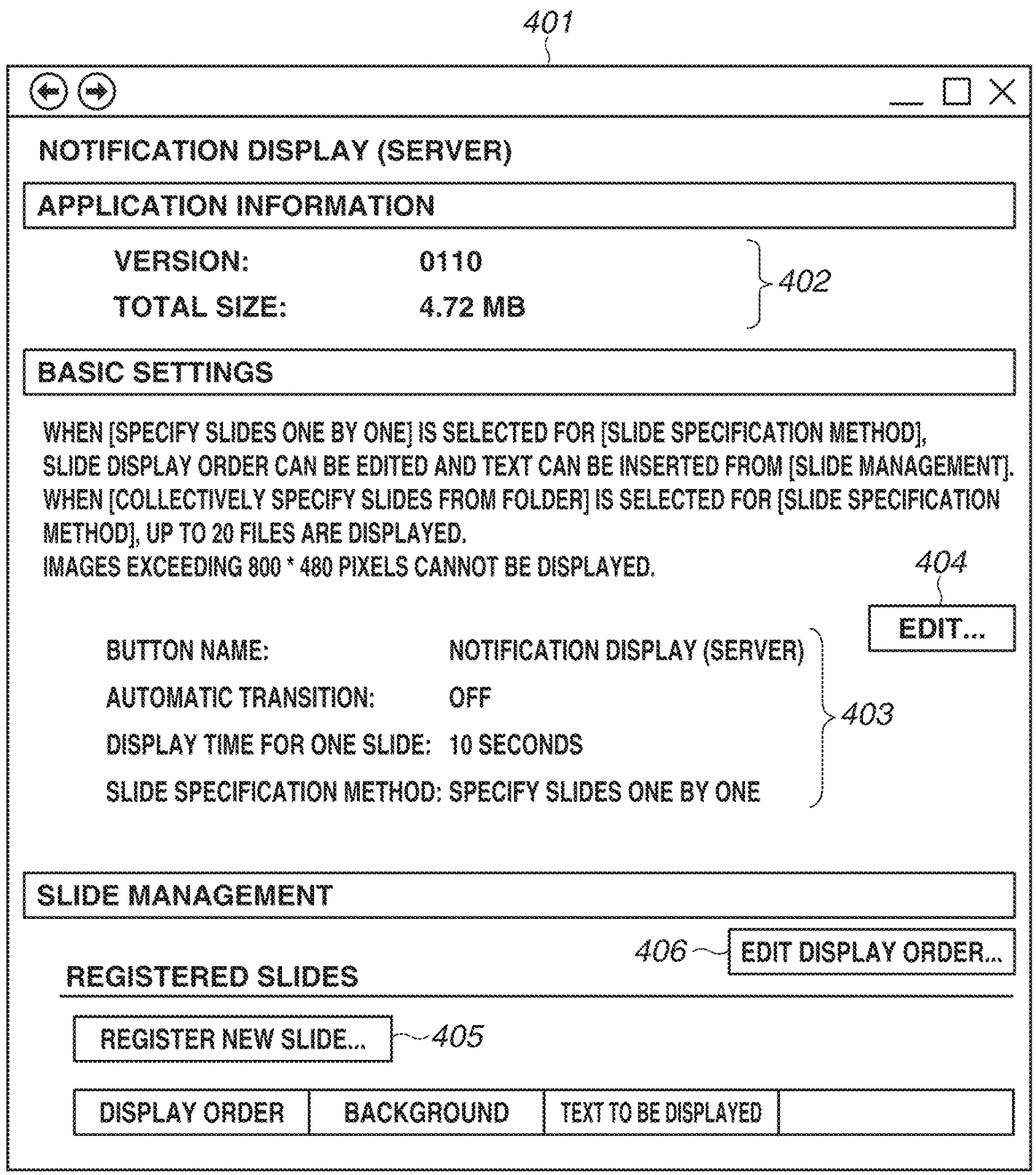
FIG. 4 illustrates a top screen of an extended application setting screen.

FIG. 4 illustrates the top screen 401 of setting screens of the extended application 310. An application information area 402 displays the version and the size of the extended application 310. A basic settings area 403 displays the contents set in the basic setting editing screen 501 which is displayed when an Edit button 404 is pressed.

Figure 5:
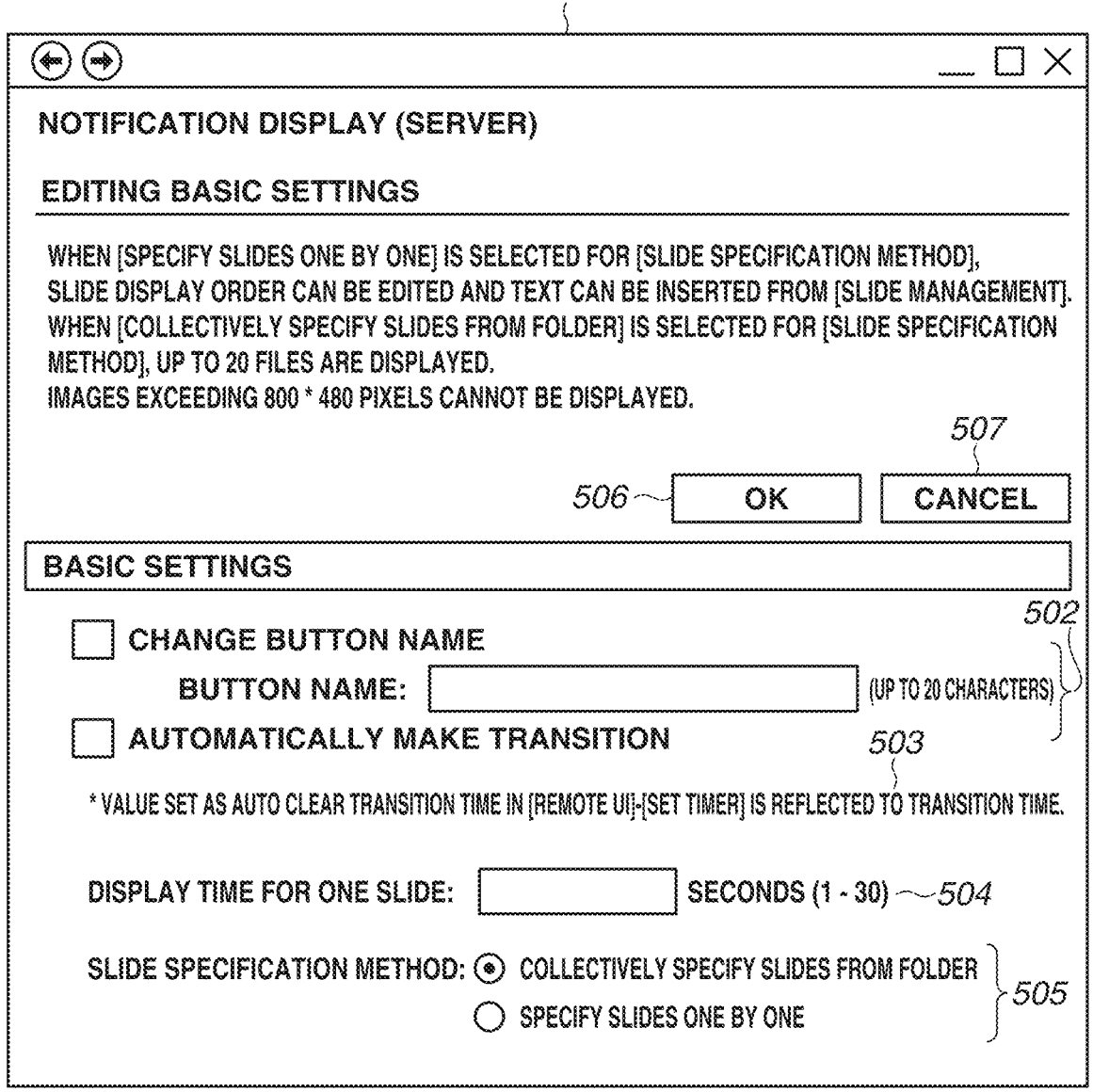
FIG. 5 illustrates an example of a basic setting editing screen.

FIG. 5 illustrates an example of the basic setting editing screen 501 which is displayed when the Edit button 404 in FIG. 4 is pressed. The basic setting editing screen 501 includes a Button Name option 502, the automatic application start setting ("Automatically Make Transition") option 503, a "Display Time for One Slide" option 504, and a Slide Specification Method option 505. The Slide Specification Method option 505 is an option for selecting a method for specifying display target image files from a method for collectively specifying slides from a folder and a method for specifying slides one by one. When an OK button 506 in FIG. 5 is pressed, the contents set by the above-described setting options are registered in the extended application 310. When a Cancel button 507 in FIG. 5 is pressed, the contents set by the above-described setting options are canceled, and control returns to the top screen 401 of setting screens of the extended application 310.

When the OK button 506 is pressed in a state where "Specify Slides One by One" is selected in the basic setting editing screen 501, the top screen 401 of setting screens of the extended application 310 displays a Slide Management area including a "Register New Slide" button 405.

FIG. 6 illustrates an example of the new slide registration screen 601 which is displayed when the user presses the "Register New Slide" button 405 in the top screen 401 of setting screens of the extended application 310. For a Background option 602, the user selects "Specify Image with Path", "Specify Image with URL", or "Specify Color". When "Specify Image with Path" or "Specify Image with URL" is selected, the user can specify (register) the path of the image file or the Uniform Resource Locator (URL) of the image file with a File Location option 603. When "Specify Image with Path" is selected, the user sets the user name and password for accessing the image file by using a User Name option 604 and a Password option 605. When an OK button 609 as a connection check button is pressed, connection check is performed based on the information set by the File Location option 603, the User Name option 604, and the Password option 605 in the new slide registration screen 601.

Figure 7:
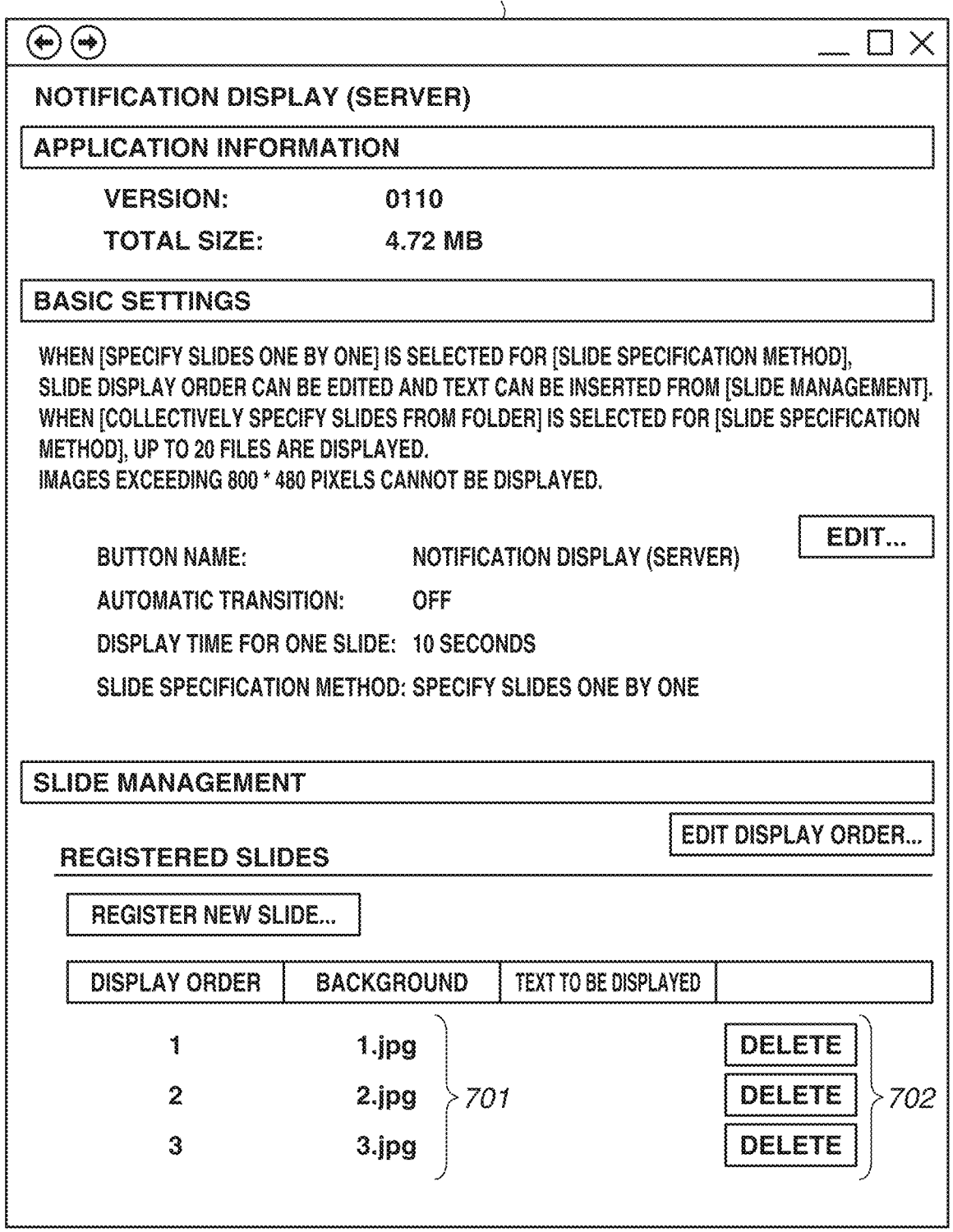
FIG. 7 illustrates an example of the top screen of the extended application setting screen in a state where "Specify Slides One by One" is selected for a Slide Specification Method option.

When the "Specify Color"" is selected for the Background option 602, the user sets the background color by using a Background Color option 606. The new slide registration screen 601 further includes a "Display Text on Slide" option 607 for specifying whether a text is to be displayed on the slide. The new slide registration screen 601 further includes display text setting options 608 including "Text to Be Displayed", "Font,", "Font Size", "Font Color", "Scroll Text Speed", and "Scroll Direction". When the OK button 609 is pressed, the contents set by the setting options in FIG. 6 are registered in the extended application 310, and control returns to the top screen 401 of setting screens of the extended application 310. FIG. 7 illustrates an example of the top screen 401 of setting screens of the extended application 310 displayed after the depression of the OK button 609. The top screen 401 of setting screens of the extended application 310 displays a list 701 of the slides registered in the new slide registration screen 601. The extended application 310 displays image files on the display unit 105 of the MFP 10 according to the order displayed in the list 701. The slides displayed in the list 701 can be deleted by pressing Delete buttons 702. When a Cancel button 610 in FIG. 6 is pressed, the contents set by the setting options in FIG. 6 are canceled, and control returns to the top screen 401 of setting screens of the extended application 310.

Slides 1107, 1108, and 1109 in FIG. 11B are examples of display when slides are specified as in the list 701 in FIG. 7. The extended application 310 successively displays each slide in the list 701 according to the time period specified by the "Display Time for One Slide" option 504 in the basic setting editing screen 501. Referring to the example illustrated in FIG. 11B, the slide 1107 is displayed. When the time period specified by the "Display Time for One Slide" option 504 has elapsed, the slide 1108 is displayed. When the time period specified by the "Display Time for One Slide" option 504 has elapsed again, the slide 1109 is displayed. Following the slide 1109, the slide 1107 is displayed, i.e., the above-described display sequence is repeated.

Figure 8:
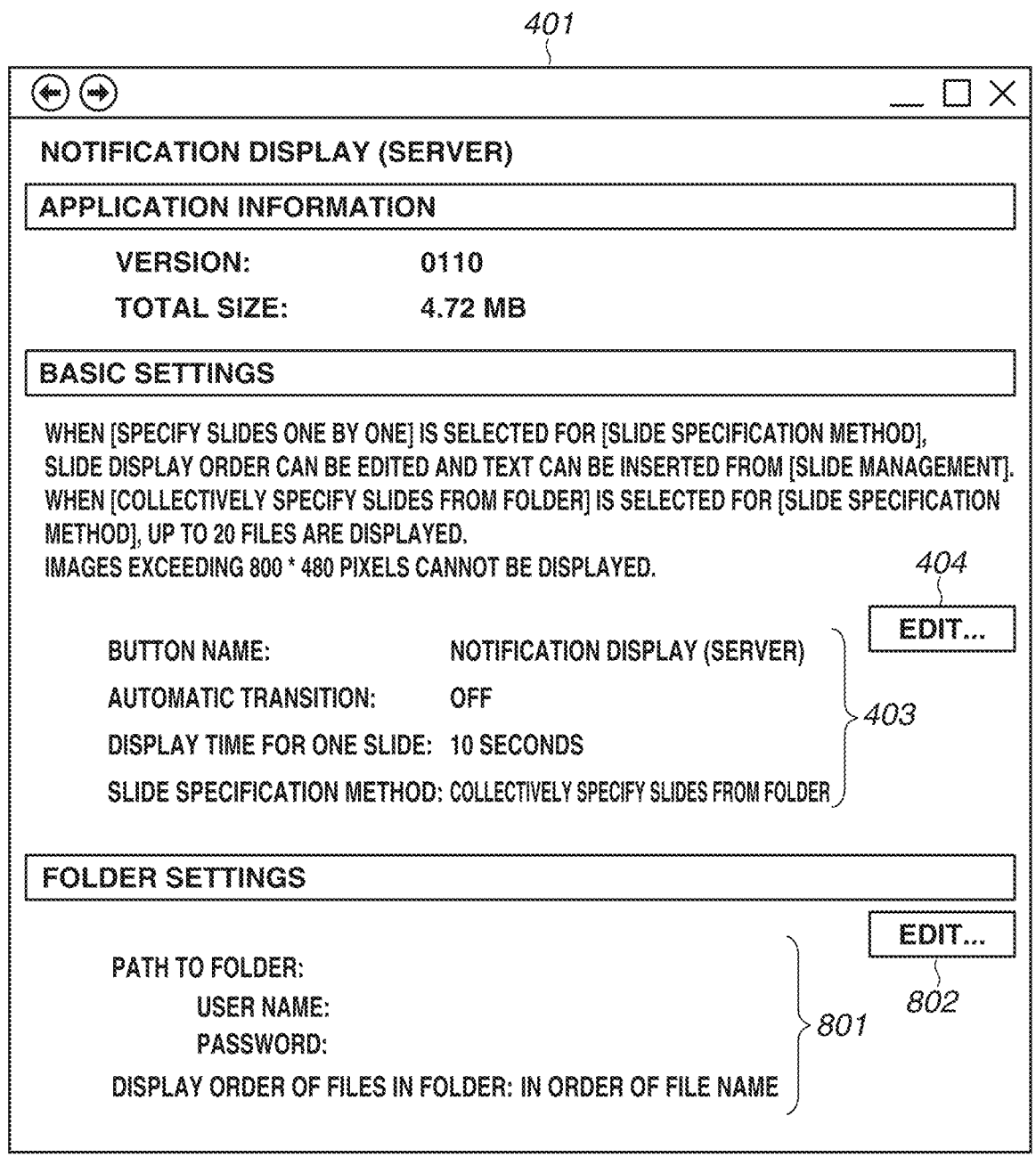
FIG. 8 illustrates an example of the top screen of the extended application setting screen in a state where "Collectively Specify Slides from Folder" is selected for the Slide Specification Method option.

FIG. 8 illustrates an example of the top screen 401 of setting screens of the extended application 310 when the OK button 506 is pressed in a state where "Collectively Specify Slides from Folder" is selected for the Slide Specification Method option 505 in the basic setting editing screen 501. When "Collectively Specify Slides from Folder" is selected for the Slide Specification Method option 505 in the basic setting editing screen 501, the top screen 401 of setting screens of the extended application 310 displays a folder setting area 801. The folder setting area 801 displays the contents set in the folder setting editing screen 901 which is displayed when an Edit button 802 is pressed.

Figure 9:
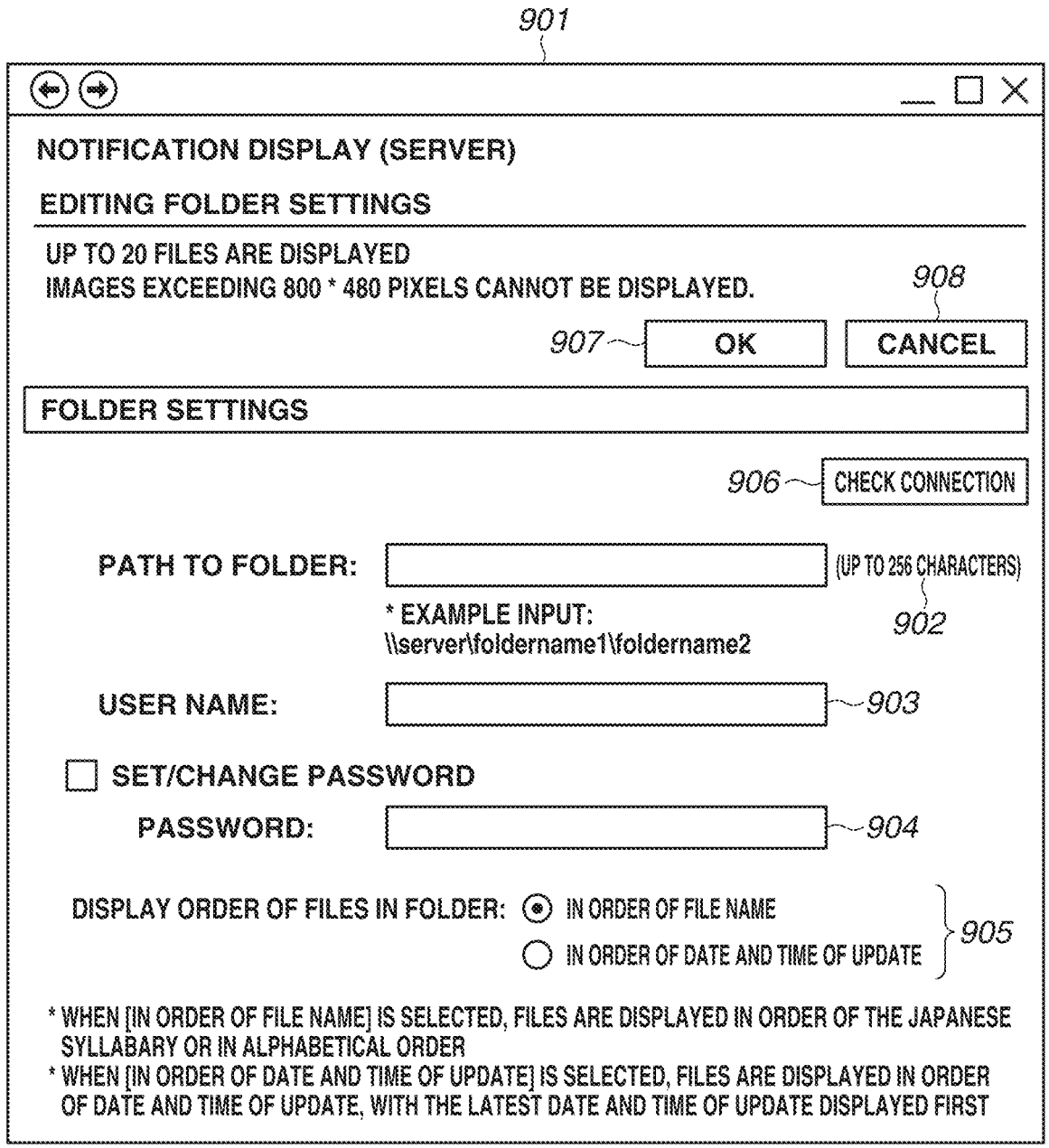
FIG. 9 illustrates an example of a folder setting editing screen.

FIG. 9 illustrate an example of the folder setting editing screen 901 which is displayed when the Edit button 802 is pressed. The user sets information about the path to the folder where display target image files are stored (folder path), to a "Path to Folder" option 902.

The user also sets the user name and password for accessing the folder to a User Name option 903 and a Password option 904, respectively. By pressing a "Check Connection" button 906, the user checks connection by using setting information set in the "Path to Folder" option 902, the User Name option 903, and the Password option 904. The user selects "In Order of File Name" or "In Order of Date and Time of Update" for a "Display Order of Files in Folder" option 905.

According to the setting selected for the "Display Order of Files in Folder" option 905, image files stored in the folder set for the "Path to Folder" option 902 (image data in the folder path) are sequentially displayed in the display unit 105 of the MFP 10. Although, in this case, the user sets "In Order of File Name" or "In Order of Date and Time of Update" for the "Display Order of Files in Folder" option 905, other methods for setting the display order of files in the folder are also applicable.

Figure 10:
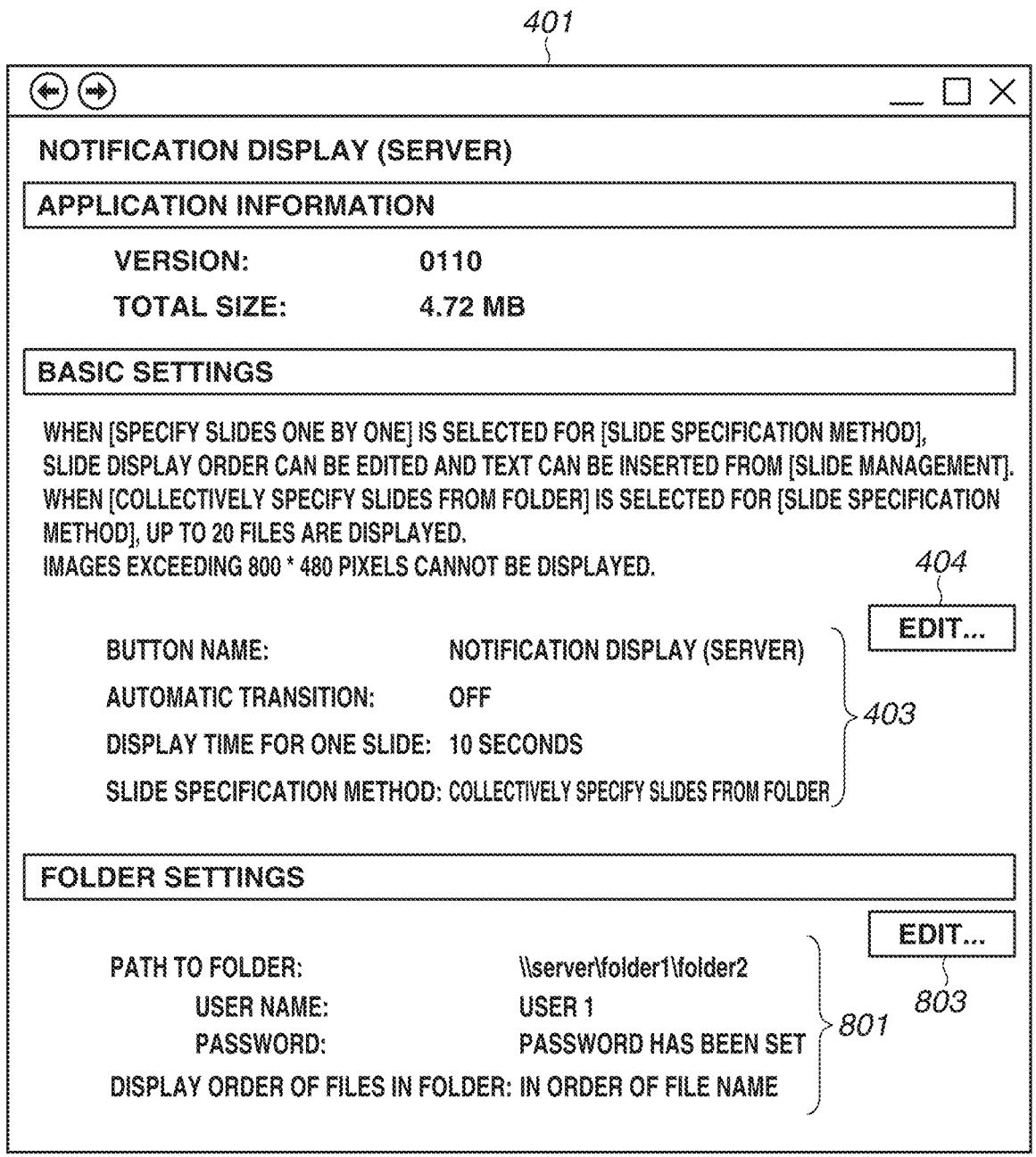
FIG. 10 illustrates an example of information set in the screen in FIG. 9, when displayed in the top screen of the extended application setting screen.

When the OK button 907 in FIG. 9 is pressed, the contents set by the above-described setting options are registered to the extended application 310, and control returns to the top screen 401 of setting screens of the extended application 310. Information set in the screen in FIG. 9 is displayed in the folder setting area 801 in the top screen 401 of setting screens of the extended application 310. FIG. 10 illustrates an example of information set in the screen in FIG. 9, when displayed in the top screen 401 of setting screens of the extended application 310. When the Cancel button 908 in FIG. 9 is pressed, the contents set by the above-described setting options are canceled, and control returns to the top screen 401 of setting screens of the extended application 310.

<Control Flow>

Processing for registering and displaying settings of the extended application 310 according to the present exemplary embodiment will be described in detail below with reference to FIGS. 15 to 17.

Figure 15:
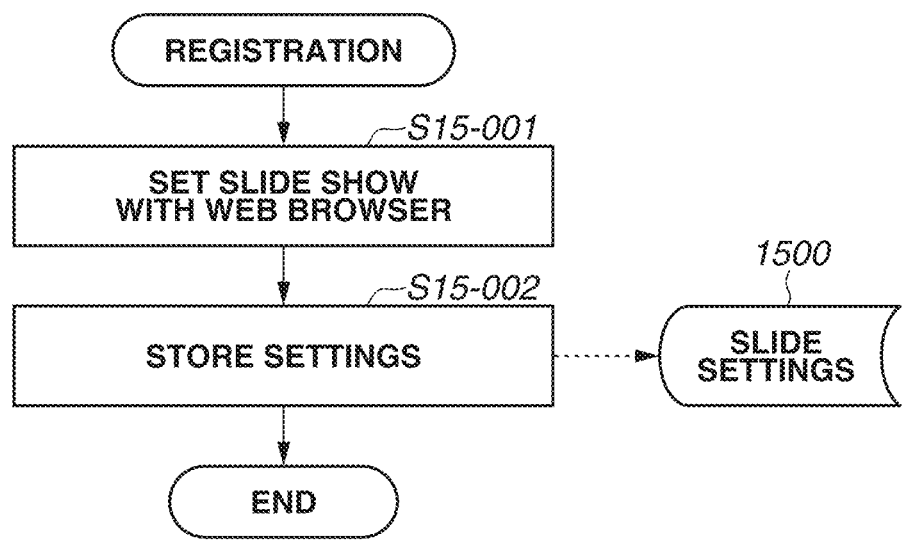
FIG. 15 is a flowchart illustrating processing for registering slide show settings on the extended application.

FIG. 15 is a flowchart illustrating processing for registering slide show settings in the extended application 310 according to the present exemplary embodiment.

The registration processing illustrated in FIG. 15 is HyperText Transfer Protocol (HTTP) servlet processing. The relevant registration processing is configured to be called when the user accesses a predetermined URL by using a web browser of the information processing apparatus 60 illustrated in FIG. 1. The relevant registration processing is part of processing for configuring a slide show application (not illustrated) installed in the extended application 310. As described above, the VM/FW unit 309 interprets the script language describing the relevant processing, and the CPU 101 executes the interpreted contents via the VM/FW unit 309.

In step S15-001, the CPU 101 displays the screens described above with reference to FIGS. 4 to 10 on the web browser, and the user sets a slide show by using various options.

In step S15-002, the CPU 101 stores the slide show settings made in step S15-001 in a slide setting area 1500. For the sake of convenience, FIGS. 4 to 10 have been described above on the premise that the set contents are registered in the extended application 310. However, in a precise sense, the set contents are entirely stored in the slide setting area 1500 on the storage unit 306 illustrated in FIG. 3, assigned to the slide show application installed in the extended application 310. The setting data stored in the slide setting area 1500 will be described in detail below with reference to FIG. 18.

Figure 16:
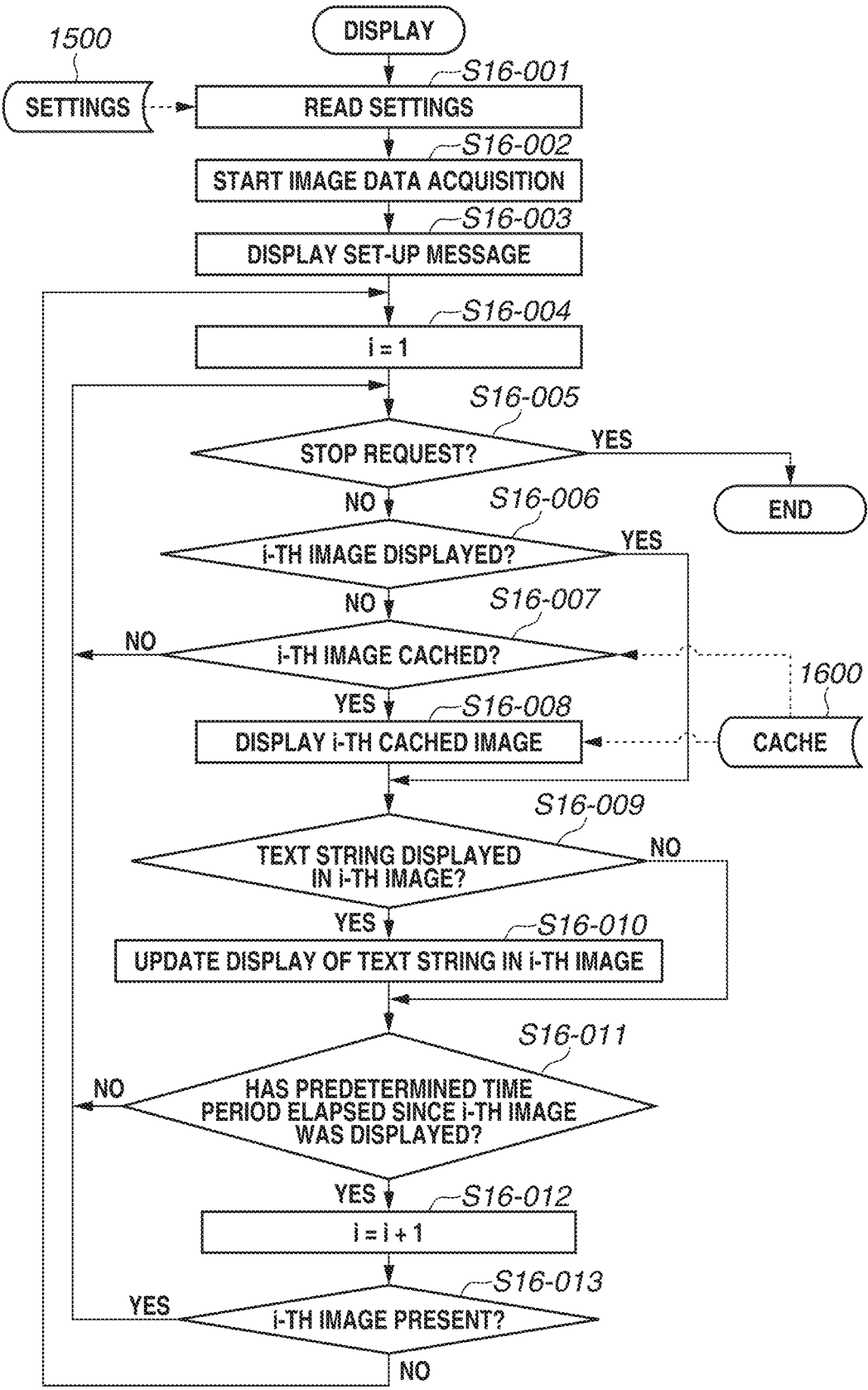
FIG. 16 is a flowchart illustrating processing for displaying a slide show on the extended application.

FIG. 16 is a flowchart illustrating processing for displaying a slide show on the extended application 310 according to the present exemplary embodiment.

The processing for displaying a slide show illustrated in FIG. 16 is part of processing for configuring the slide show application installed in the extended application 310. Like the registration processing illustrated in FIG. 15, the VM/FW unit 309 interprets the script language describing the relevant processing, and the CPU 101 executes the interpreted contents via the VM/FW unit 309.

This processing is called when the user presses the button 1106 illustrated in FIG. 11A or when the timing set by the automatic application start setting ("Automatically Make Transition") option 503 in the basic setting editing screen 501 comes, then in step S13-040 illustrated in FIG. 13.

In step S16-001, the CPU 101 reads the slide show settings stored in step S15-002 in FIG. 15 from the slide setting area 1500.

In step S16-002, the CPU 101 starts image data acquisition processing.

To simplify descriptions, FIG. 14 illustrates that the image display in step S14-140 is performed after image data has been stored in steps S14-070 and S14-130. However, in a precise sense, the processing for displaying a slide show and the image data acquisition processing asynchronously and parallelly operate with each other. In more detail, each time the slide show display is requested, the image data acquisition is performed. Then, the image data is once acquired, and the image data once acquired is subsequently used for display until the slide show display is completed. The flow of the image data acquisition processing will be described in detail below.

In step S16-003, the CPU 101 instructs the display unit 105 to display a message indicating that the preparation is in progress.

In step S16-004, the CPU 101 sets an index i to 1. Then, the processing proceeds to the next step.

When "Specify Slides One by One" is selected for the Slide Specification Method option 505 illustrated in FIG. 5, the index i indicates the display order of the list 701 illustrated in FIG. 7. When "Collectively Specify Slides from Folder" is selected for the Slide Specification Method option 505 illustrated in FIG. 5, the index i indicates the display order of files based on the setting of the "Display Order of Files in Folder" option 905 illustrated in FIG. 9. Setting the index i to 1 means indicating the first image.

In step S16-005, the CPU 101 determines whether a request for deactivating the slide show application is issued. The VM/FW unit 309 according to the present exemplary embodiment is configured to issue a deactivation request to the extended application 310 when the user touches an arbitrary point on the screen of the display unit 105 during operation of the slide show application. The VM/FW unit 309 is configured to issue the deactivation request to the extended application 310 also when any key on the operation unit 107 is pressed. If the user performs the above-described operation, the deactivation request is issued and the display processing ends. Although not illustrated in detail because of little relation with the present disclosure, the CPU 101 issues a request for forcibly deactivating the image data acquisition processing (described below) to the VM/FW unit 309 at this timing. When the deactivation request is not issued (NO in step S16-005), the processing proceeds to step S16-006.

In step S16-006, the CPU 101 determines whether the display of the i-th image is completed. When the display is not completed (NO in step S16-006), the processing proceeds to step S16-007. On the other hand, when the display is completed (YES in step S16-006), the CPU 101 skips the processing for displaying the i-th image. Then, the processing proceeds to step S16-009.

In step S16-007, the CPU 101 determines whether the i-th image has been cached in a cache area 1600 through the image data acquisition processing started in step S16-002. The cache area 1600 is allocated on the storage unit 306 illustrated in FIG. 3. The term "cached" means a state where a cached image is enabled and available for the slide display. When the i-th image has been cached (YES in step S16-007), the processing proceeds to step S16-008. On the other hand, when the i-th image has not been cached (NO in step S16-007), the processing returns to step S16-005.

In step S16-008, the CPU 101 displays the i-th cached image on the display unit 105. When a "Specify Color" is set for the Background option 602 illustrated in FIG. 6, the CPU 101 does not actually acquire an image in the image data acquisition processing (described below) but assumes that the image has been cached. In this case, the CPU 101 draws the background with the specified color in step S16-008. Because of little relation with the present disclosure, detailed descriptions will be omitted. As discussed below, an error state indicating that the acquisition of the i-th image data has failed may be set to the cache area 1600 through the image data acquisition processing. In this case, the image data indicating that the i-th image cannot be displayed, prestored in the slide show application, is displayed on the screen.

In step S16-009, the CPU 101 determines whether a text string is set to be displayed in the i-th image, by using the "Display Text on Slide" option 607 illustrated in FIG. 6. When the text string display is set (YES in step S16-009), the processing proceeds to step S16-010. On the other than, when the text string display is not set (NO in step S16-009), the processing proceeds to step S16-011.

In step S16-010, the CPU 101 displays the text string for the i-th image based on the settings of the display text setting option 608 illustrated in FIG. 6. The CPU 101 also suitably updates the display depending on the setting of the scroll direction.

In step S16-011, the CPU 101 confirms the time period that has elapsed since the i-th image started being displayed to determine whether the predetermined time period set by the "Display Time for One Slide" option 504 illustrated in FIG. 5 has elapsed. When the predetermined time has elapsed (YES in step S16-011), the processing proceeds to step S16-012. On the other hand, when the predetermined time has not elapsed (NO in step S16-011), the processing returns to step S16-005.

In step S16-012, the CPU 101 increments the index i by one. In step S16-013, the CPU 101 determines whether the i-th image indicated by the incremented index i exists. When the i-th image is present (YES in step S16-013), the processing returns to step S16-005. On the other hand, when the i-th image is not present (NO in step S16-013), the processing returns to step S16-004.

Figure 17:
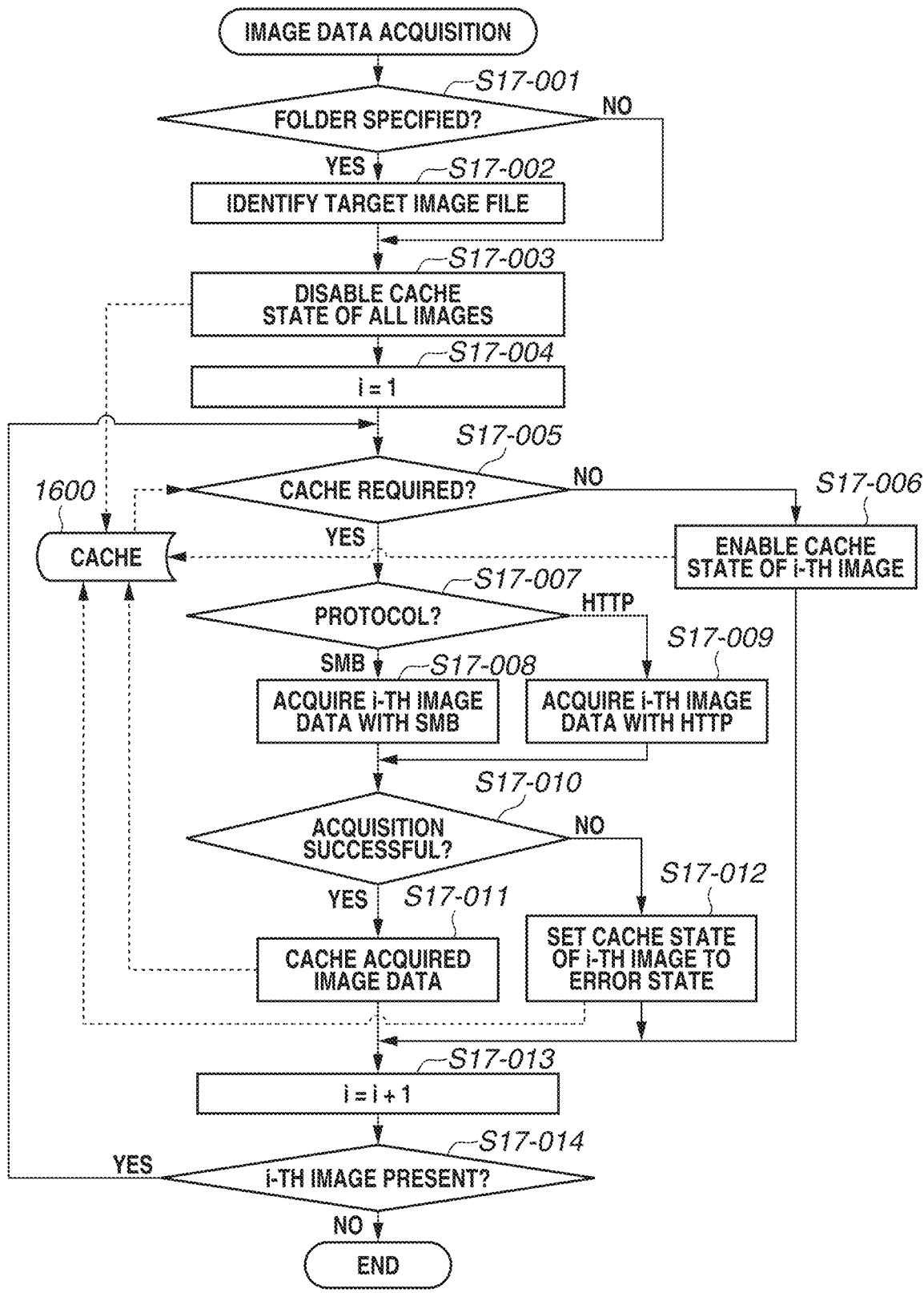
FIG. 17 is a flowchart illustrating processing for acquiring slide show image data on the extended application.

FIG. 17 is a flowchart illustrating processing for acquiring slide show image data in the extended application 310 according to the present exemplary embodiment.

The processing for acquiring slide show image data illustrated in FIG. 17 is part of the processing for configuring the slide show application installed in the extended application 310. Like the display processing illustrated in FIG. 16, the VM/FW unit 309 interprets the script language describing the relevant processing, and the CPU 101 executes the interpreted contents via the VM/FW unit 309.

As described above, in step S16-002 illustrated in FIG. 16, this processing is activated so as to asynchronously and parallelly operate with the display processing.

In step S17-001, the CPU 101 determines whether the setting of the slide specification method read in step S16-001 is "Collectively Specify Slides from Folder". When the setting of the Slide Specification Method option 505 illustrated in FIG. 5 is "Collectively Specify Slides from Folder" (YES in step S17-001), the processing proceeds to step S17-002. On the other hand, when the setting of the Slide Specification Method option 505 is not "Collectively Specify Slides from Folder" (NO in step S17-001), the processing proceeds to step S17-003.

In step S17-002, the CPU 101 identifies target image files based on the setting of the "Display Order of Files in Folder" option 905 illustrated in FIG. 9, and determines the display order. More specifically, based on the "Path to Folder" option 902, the CPU 101 accesses the specified folder by using the SMB protocol. Then, for example, when the setting of the "Display Order of Files in Folder" option 905 is "In Order of File Name", the CPU 101 acquires a list of file names stored in the folder. Then, the CPU 101 sorts the acquired list in order of the file name and identifies the predetermined number of files from the top downward as target image files. Finally, for the sake of subsequent processing, the CPU 101 converts each of the paths of the identified files into the same format as the internal path information when "Specify Slides One by One" is specified as a slide specification method.

In step S17-003, the CPU 101 once disables the cache states of all of the image data prestored in the cache area 1600.

In step S17-004, the CPU 101 sets the index i to 1. Then, the processing proceeds to the next step. Like the descriptions of step S16-004 illustrated in FIG. 16, the index i indicates the display order of files. Setting the index i to 1 means indicating the first image.

In step S17-005, the CPU 101 determines whether the i-th image needs to be cached. This determination is equivalent to the sequence in step S14-040 illustrated in FIG. 14. More specifically, the CPU 101 compares the image meta information received in step S14-030 and the image meta information prestored in the cache area 1600 to confirm whether the image meta information has been updated. When the date and time of update of the received image meta information is later than the date and time of update of the prestored image meta information, the CPU 101 determines that the image meta information has been updated. Alternatively, when the size of the received image meta information is different from the size of the prestored image meta information, the CPU 101 determines that the image meta information has been updated. In addition, when the relevant image meta information is not prestored in the cache area 1600, the CPU 101 assumes that the image meta information has been updated. When the CPU 101 determines that the image meta information has not been updated (NO in step S17-005), the processing proceeds to step S17-006. On the other hand, when the CPU 101 determines that the image meta information has been updated (YES in step S17-005), the processing proceeds to step S17-007.

In step S17-006, the CPU 101 enables the cache state of the i-th image once disabled in step S17-003. Then, the processing proceeds to step S17-011. In step S16-007 illustrated in FIG. 16, the CPU 101 determines that the i-th image has been cached. As described in step S16-008 illustrated in FIG. 16, when "Specify Color" is selected for the Background option 602 illustrated in FIG. 6, the CPU 101 determines that the i-th image has been cached and enables the cache state although the image is not actually acquired.

In step S17-007, the CPU 101 determines whether a path or URL is selected for the Background option 602 illustrated in FIG. 6. When a path is specified ("Specify Image with Path" is selected) (smb in step S17-007), the CPU 101 determines that access based on the SMB protocol will be used. Then, the processing proceeds to step S17-008. On the other hand, when a URL is specified ("Specify Image with URL" is selected) (http in step S17-007), the CPU 101 determines that access based on the http protocol will be used. Then, the processing proceeds to step S17-009.

In step S17-008, the CPU 101 acquires the i-th image data from the path specified by the File Location option 603 illustrated in FIG. 6, by using the SMB protocol. The CPU 101 also requests the SMB authentication based on the authentication information set by the User Name option 604 and the Password option 605. Upon completion of the acquisition processing, the processing proceeds to step S17-010.

In step S17-009, the CPU 101 acquires the i-th image data from the URL specified by the File Location option 603 illustrated in FIG. 6, by using the http protocol. Upon normal completion of the acquisition processing or upon cancellation of the acquisition processing for some reason, the processing proceeds to step S17-010.

In step S17-010, the CPU 101 determines whether the acquisition of the i-th image data is successful in step S17-008 or S17-009. When the image data acquisition is successful (YES in step S17-010), the processing proceeds to step S17-011. On the other hand, when the image data acquisition is canceled for some reason and fails (NO in step S17-010), the processing proceeds to step S17-012. Examples of typical reasons for canceling the image data acquisition include disconnection due to a network circuit failure, SMB authentication failure, and time-out due to a http server breakdown. The image data acquisition may possibly be canceled when a file in the specified path is deleted. Since the MFP 10 according to the present exemplary embodiment has a very small capacity of the storage unit 306 available for the cache operation, the acquisition of image data exceeding a predetermined size is to be canceled.

When the image data acquisition is normally completed (YES in step S17-010), then in step S17-011, the CPU 101 stores the acquired i-th image data in the cache area 1600. At the same time, the CPU 101 updates the image meta information for the i-th image data to the acquired information and enables the cache state of the i-th image.

On the other hand, when the image data acquisition fails (NO in step S17-010), then in step S17-012, the CPU 101 sets the cache state of the i-th image data to an error state. Thus, as illustrated in FIG. 16, prepared image data indicating that the i-th image cannot be displayed is displayed on the screen.

In step S17-013, the CPU 101 increments the index i by one.

In step S17-014, the CPU 101 determines whether a request for displaying the i-th image indicated by the incremented index i is present. When the request for displaying the i-th image is present (YES in step S17-014), the processing returns to step S17-005. On the other hand, when the request is not present (NO in step S17-014), the CPU 101 ends the image data acquisition processing.

As described above with reference to FIGS. 16 and 17, the image data is sequentially acquired according to the file display order based on the setting of the "Display Order of Files in Folder" option 905 illustrated in FIG. 9. Then, the CPU 101 sequentially displays a slide show based on the acquired image data. Thus, the user can sequentially display a slide show starting from the acquired image data without waiting for completion of the image data acquisition. More specifically, to minimize the waiting time for the image data display, it is most suitable to acquire image data according to the display order of files as described above. However, the slide show display can be implemented even with other image data acquisition methods.

FIG. 18 illustrates an example of setting data to be stored in the slide setting area 1500 illustrated in FIG. 15.

The setting data is stored in the slide setting area 1500 in step S15-002 when the OK button 506, 609, or 907 is pressed in the basic setting editing screen 501, the new slide registration screen 601, or the folder setting editing screen 901, respectively. As described above, the slide setting area 1500 is assigned to the area dedicated for the slide show application in the storage unit 306 on the eMMC 109.

The values registered in the Button Name option 502, the "Display Time for One Slide" option 504, and the Slide Specification Method option 505 are set as descriptions 2004, 2026, and 2025, respectively, in FIG. 18. When the OK button 907 is pressed in the folder setting editing screen 901, the values of items of a description 2002 in setting data 2001 are set. When the OK button 609 is pressed in the new slide registration screen 601, the values of items of a description 2003 in the setting data 2001 are set. The values registered in the "Path to Folder" option 902, the User Name option 903, and the Password option 904 in the folder setting editing screen 901 are set as descriptions 2005 to 2008 in FIG. 18. Referring to the example illustrated in FIG. 18, since the description 2008 is information about the password, the value registered in the Password option 904 is set in an encrypted way. The value corresponding to "In Order of File Name" or "In Order of Date and Time of Update" registered in the "Display Order of Files in Folder" option 905 is set as a description 2009 in FIG. 18. The value corresponding to "Specify Image with Path", "Specify Image with URL", or "Specify Color" registered in the Background option 602 is set as a description 2010 in FIG. 18. The location value and the file name registered in the File Location option 603 are set as descriptions 2011 and 2012, respectively, in FIG. 18. The values registered in the User Name option 604 and the Password option 605 are set as descriptions 2013 to 2015 in FIG. 18. Referring to the example illustrated in FIG. 18, since the description 2015 is information about the password, the value registered in the Password option 605 is set in an encrypted way. The value corresponding to the Background Color option 606 is set as a description 2016 in FIG. 18. Examples of options for the Background Color option 606 include "White, Black, Red, Yellow, Green, and Blue". The value registered in the "Display Text on Slide" option 607 is set as a description 2017 in FIG. 18. The values registered in the items for the display text setting option 608 are set as descriptions 2018 to 2023 in FIG. 18. Examples of the "Font" options include "Normal, Bold, Italic, and Bold+Italic". Examples of the "Font Size" options include "Large, Middle, and Small". Examples of the "Font Color" options include "White, Black, Red, Yellow, Green, and Blue". Examples of the "Scrolling Text Speed" options include "Slow, Normal, and Fast". Examples of the "Scroll Direction" options include "Do Not Scroll, Right to Left, Left to Right, From Top Downward, and From Bottom Upward". When a plurality of slides is registered in the new slide registration screen 601, information indicated by the description 2003 in FIG. 18 is generated for the number of slides according to the slide display order.

The setting state for each slide is managed by a management table 21901. This configuration enables improving the display response when displaying the settings in list form in a setting list screen (not illustrated). FIG. 23 illustrates examples of setting values for each slide registered in the new slide registration screen 601. As illustrated in FIG. 23, the management table 21901 includes information columns 21902 to 21915. As described above, each slide specified as a display target is managed by the management table 21901. The information column 21903 stores the method for specifying images to be subjected to a slide show. According to the present exemplary embodiment, since text information can be applied to images to be subjected to a slide show, the display target image is displayed as "Background". This information is specified by the Background option 602. The information column 21904 stores information about the location of the image file to be subjected to a slide show. This information is set by the File Location option 603 or the "Path to Folder" option 902. The information column 21905 stores information about the user name to be used to access an image. This information is set by the User Name option 604 or 903. The information column 21906 stores password setting information. This information stores the value according to the status of the check box of a "Set/Change Password" option 605 or 904. The information column 21907 stores information about the password. This information is set by the check box of the Password option 605 or 904. The information column 21908 stores information about the background color. This information is set by the Background Color option 606. The information column 21909 stores information about whether to display text in a slide. This information stores the value according to the input status of the check box of the "Display Text on Slide" option 607. The information column 21910 stores information about the text to be displayed. This information is set by the "Text to Be Displayed" option 608. The information column 21911 stores information about the font. This information is set by the Font option 608. The information column 21912 stores information about the font size. This information is set by the Font Size option 608. The information column 21913 stores information about the font color. This information is set by the Font Color option 608. The information column 21914 stores information about the scrolling text speed. This information is set by the Scrolling Text Speed option 608. The information column 21915 stores information about the scroll direction. This information is set by the Scroll Direction option 608.

<Display Order Setting Processing>

Figure 19:
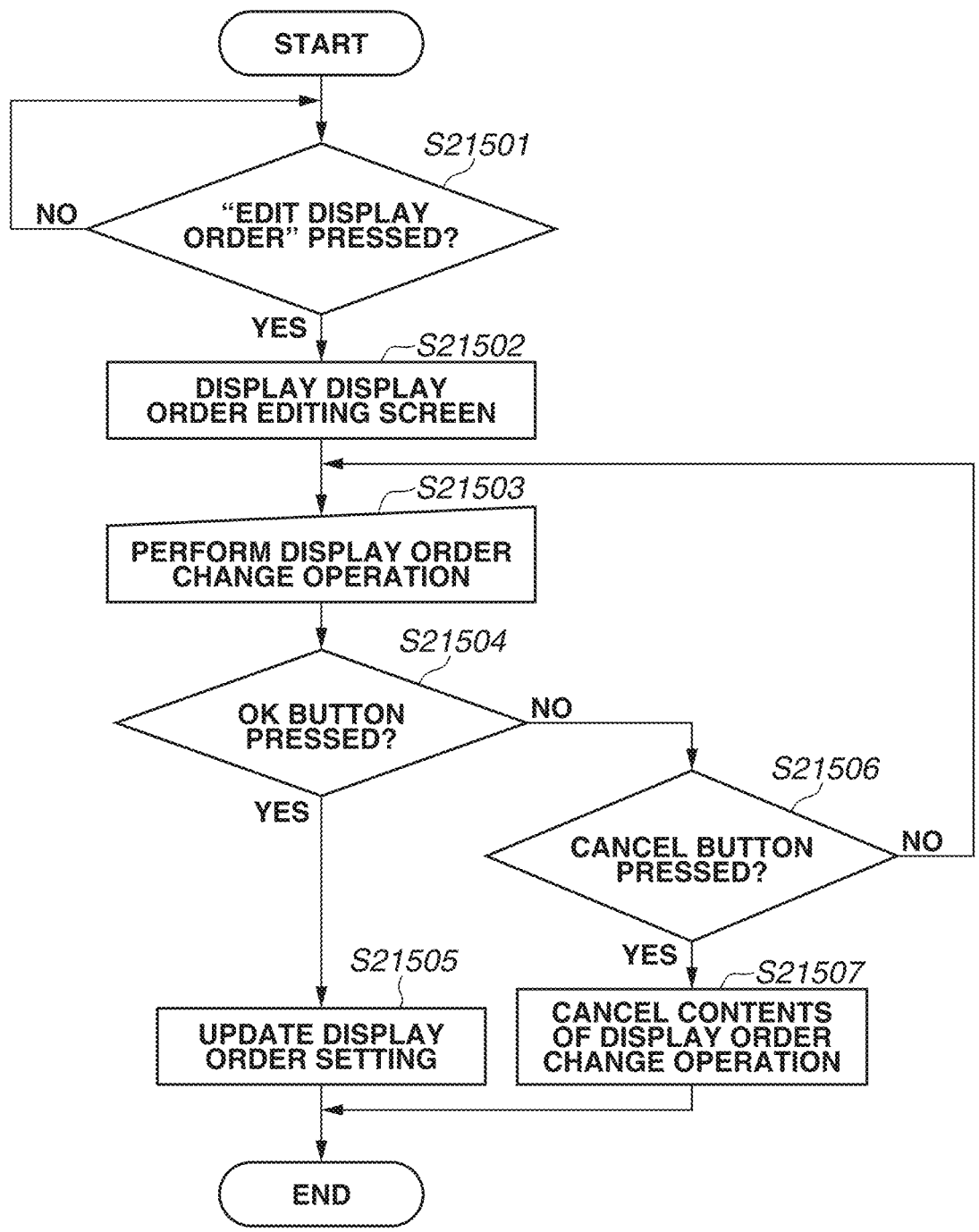
FIG. 19 is a flowchart illustrating an example of processing for changing the slide display order.
Figure 20A:
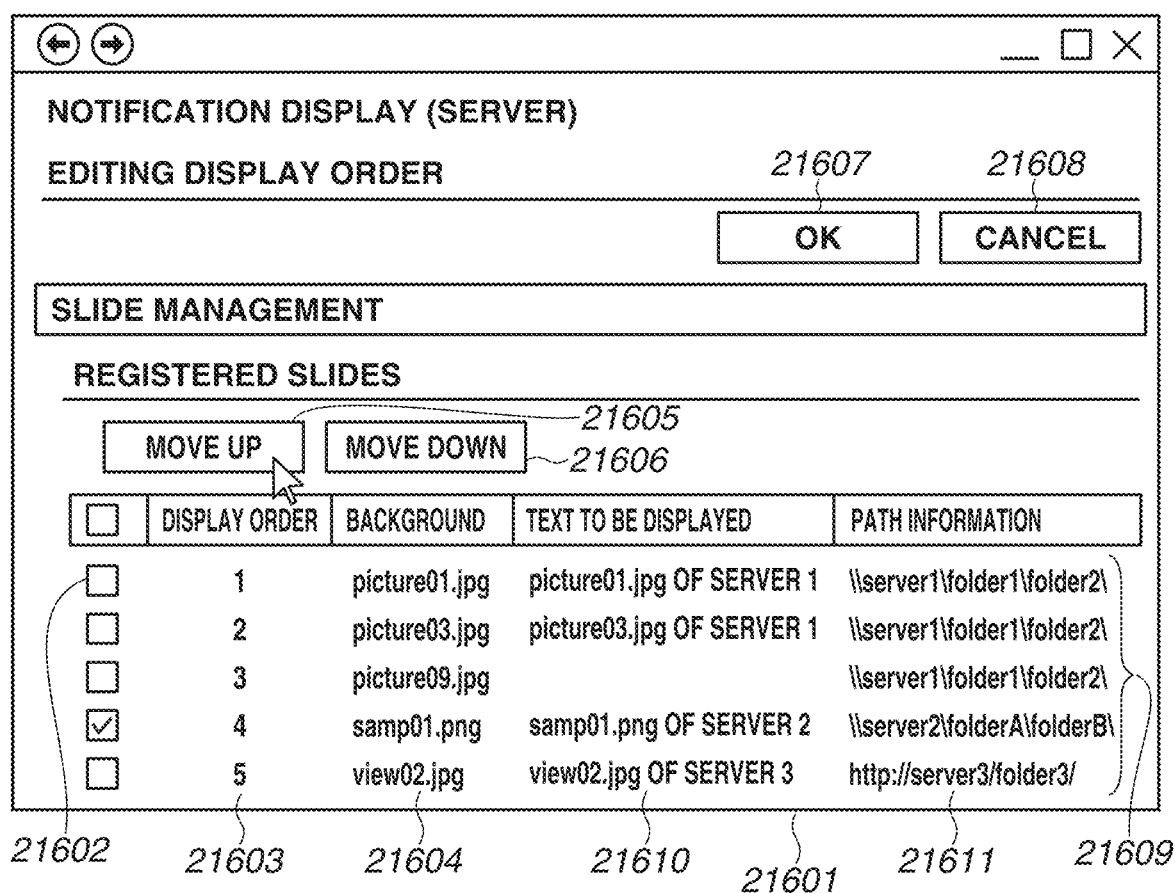
FIG. 20A illustrates an example display in a first process of a display order editing screen.

According to the present exemplary embodiments, the display order of the slide specified as the display target can be changed. The settings of the display order of a slide show will be described below with reference to FIGS. 19, 20A, and 20B. FIG. 19 is a flowchart illustrating processing for changing the display order of slides according to the present exemplary embodiment. This flowchart is implemented when the CPU 101 executes the extended application 310. FIG. 20A illustrates an example display in a first process of a display order editing screen. FIG. 20B illustrates an example display in a second process of the display order editing screen. FIGS. 20A and 20B illustrate examples of operations for setting the display order according to the management table 21901 in FIG. 19.

In step S21501, the extended application 310 determines whether an "Edit Display Order" button 406 is pressed in the top screen 401 of setting screens. When the "Edit Display Order" button 406 is not pressed (NO in step S21501), the processing returns to step S21501. Then, the extended application 310 repeats the processing. When the "Edit Display Order" button 406 is pressed (YES in step S21501), the processing proceeds to step S21502.

In step S21502, the extended application 310 performs processing for displaying a display order editing screen. In the display order editing screen, the user performs a display order change operation.

Examples of the display order editing screen are illustrated in FIGS. 20A and 20B. A display order editing screen 21601 includes a "Move Up" button 21605, a "Move Down" button 21606, an OK button 21607, a Cancel button 21608, and a list display area 21609. The list display area 21609 displays a list of slides registered in the new slide registration screen 601. The list display area 21609 includes slide display order information 21603 indicating the display order of slides, and file name information 21604 indicating file names of display target image files. The list display area 21609 also includes display text information 21610 registered in the new slide registration screen 601, and a slide selection option 21602 for selecting a slide. According to the present exemplary embodiment, the list display area 21609 further includes path information 21611 indicating path information for display target image files. When the user selects a slide by using the slide selection option 21602 in the display order editing screen 21601 and then presses the "Move Up" button 21605 or the "Move Down" button 21606, the display order in the list display area 21609 is changed.

FIG. 20A illustrates an example where image files are sequentially registered for each network path. More specifically, image files of "server1" are registered as images in the first to third display order, an image file of "server2" is registered as an image in the fourth display order, and an image file of "server 3" is registered as an image in the fifth display order. In this state, the user checks the check box of the slide selection option 21602 corresponding to the fourth image "sample01.png" and then selects the "Move Up" button 21605 twice. As a result of this operation, the display order in FIG. 20A is changed to the display order illustrated in FIG. 20B. Then, the user checks the check box of the slide selection option 21602 corresponding to the third image "picture03.jpg" and then selects the "Move Down" button 21606 twice. As a result of this operation, a display order that is the same as that indicated by the management table 21901 is displayed in the display area 21609.

In step S21504, the extended application 310 determines whether the OK button 21607 in the display order editing screen 21601 is pressed. When the extended application 310 determines that the OK button 21607 is pressed (YES in step S21504), the processing proceeds to step S21505. On the other hand, when the extended application 310 determines that the OK button 21607 is not pressed (NO in step S21504), the processing proceeds to step S21506.

In step S21505, the extended application 310 updates the display order setting (order information) according to information about the display order change operation in step S21503 and then displays the top screen 401 of setting screens. Then, the processing exits this flowchart.

In step S21506, the extended application 310 determines whether the Cancel button 21608 has been pressed in the display order editing screen 21601.

When the extended application 310 determines that the Cancel button 21608 is not pressed (NO in step S21506), the processing returns to step S21503.

On the other hand, when the extended application 310 determines that the Cancel button 21608 is pressed (YES in step S21506), the processing proceeds to step S21507.

In step S21507, the extended application 310 cancels the contents of the display order change operation and then displays the top screen 401. Then, the processing exits the flowchart.

Although a button is used as a means for performing the display order change operation, the UI is not limited thereto. For example, the following modifications are also applicable.

(First Modification)

Figure 21A:
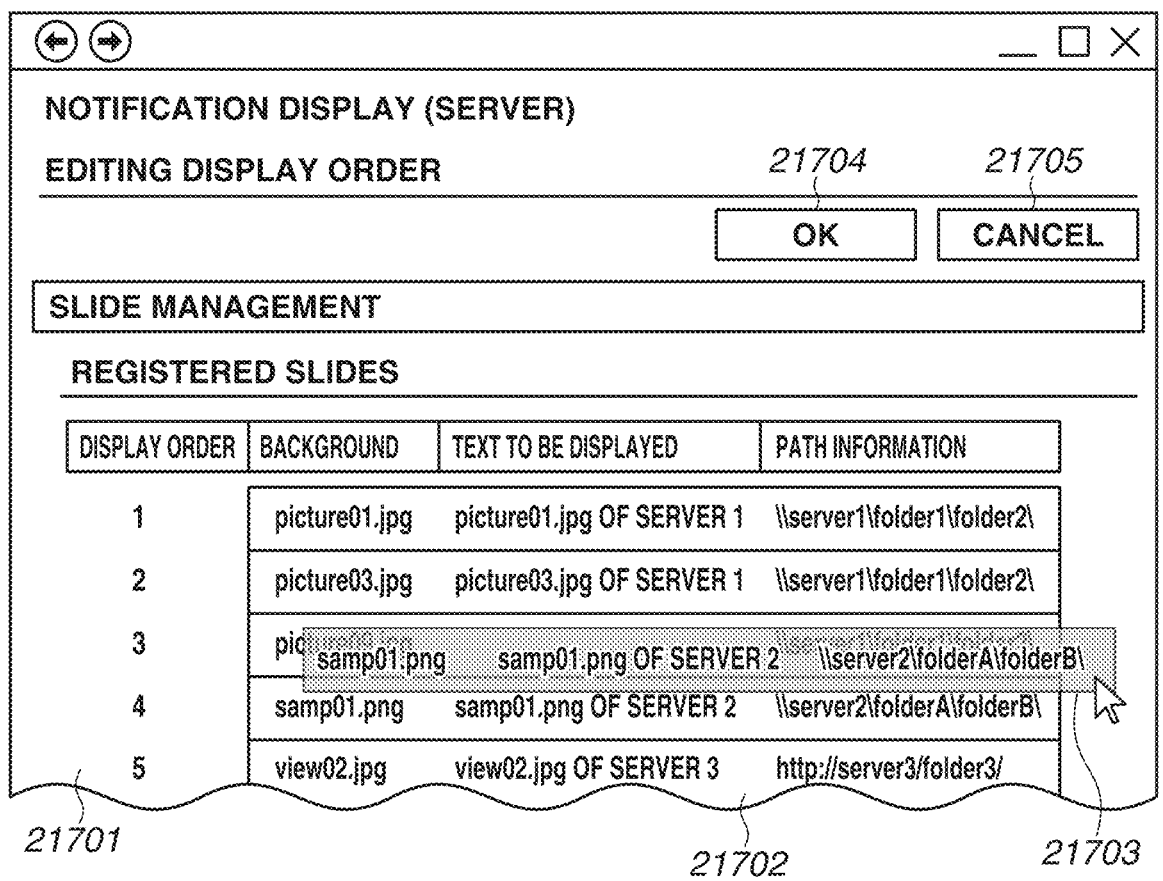
FIG. 21A illustrates an example display in the first process of the display order editing screen according to a first modification.
Figure 21B:
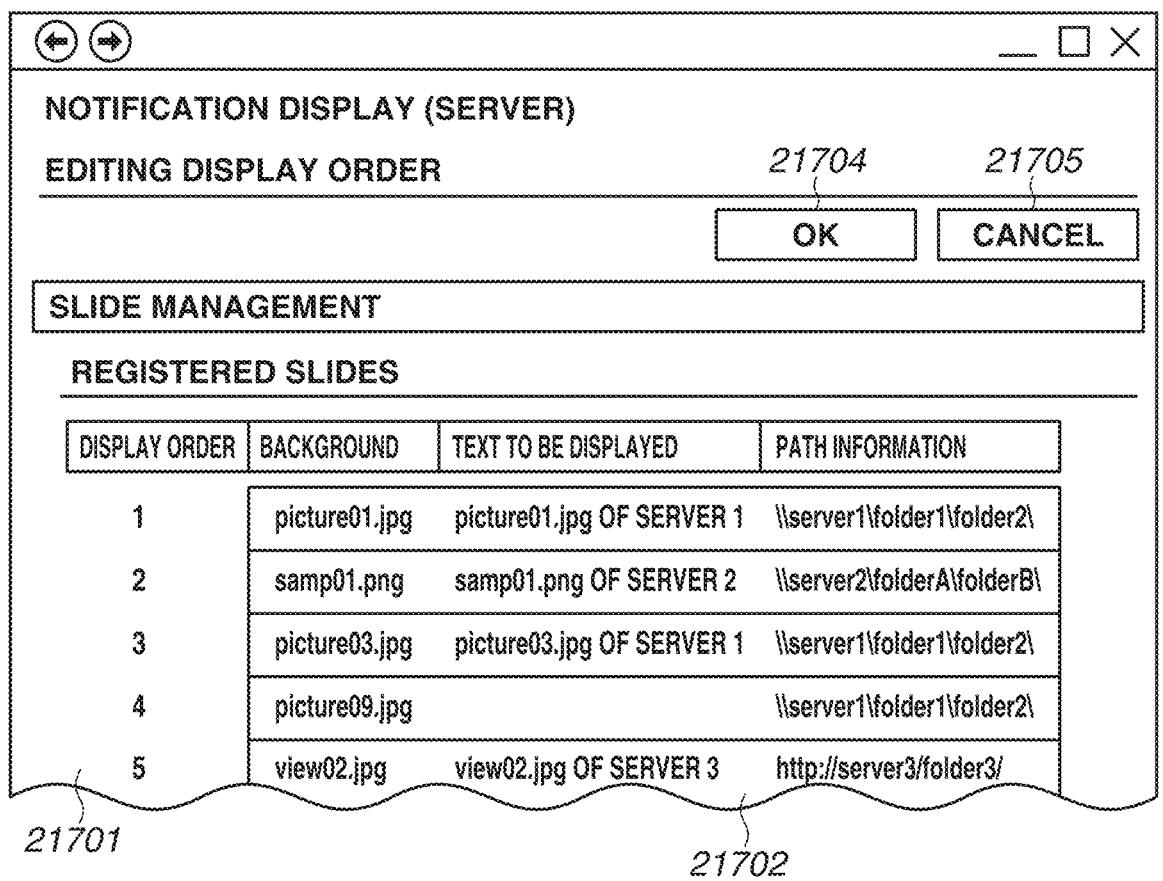
FIG. 21B illustrates an example display in the second process of the display order editing screen according to the first modification.

A first modification is configured to perform a display order change operation by moving a slide name displayed in list form with a drag-and-drop operation. FIG. 21A illustrates an example display in a first process of the display order editing screen according to the first modification. FIG. 21B illustrates an example display in a second process of the display order editing screen according to the first modification.

A display order editing screen 21701 includes a list display area 21702 for displaying a list of slides registered in the new slide registration screen 601. The list display area 21702 displays image name information in list form. The display order is changed when the user selects a slide to be subjected to display order change from the list display area 21702, moves the slide to the position of the desired display order with a drag-and-drop operation 21703, and then presses an OK button 21704. When the user presses a Cancel button 21705, the CPU 101 cancels information about the display order changed by the drag-and-drop operation 21703 and then displays the top screen 401 of setting screens of the extended application 310.

(Second Modification)

Figure 22A:
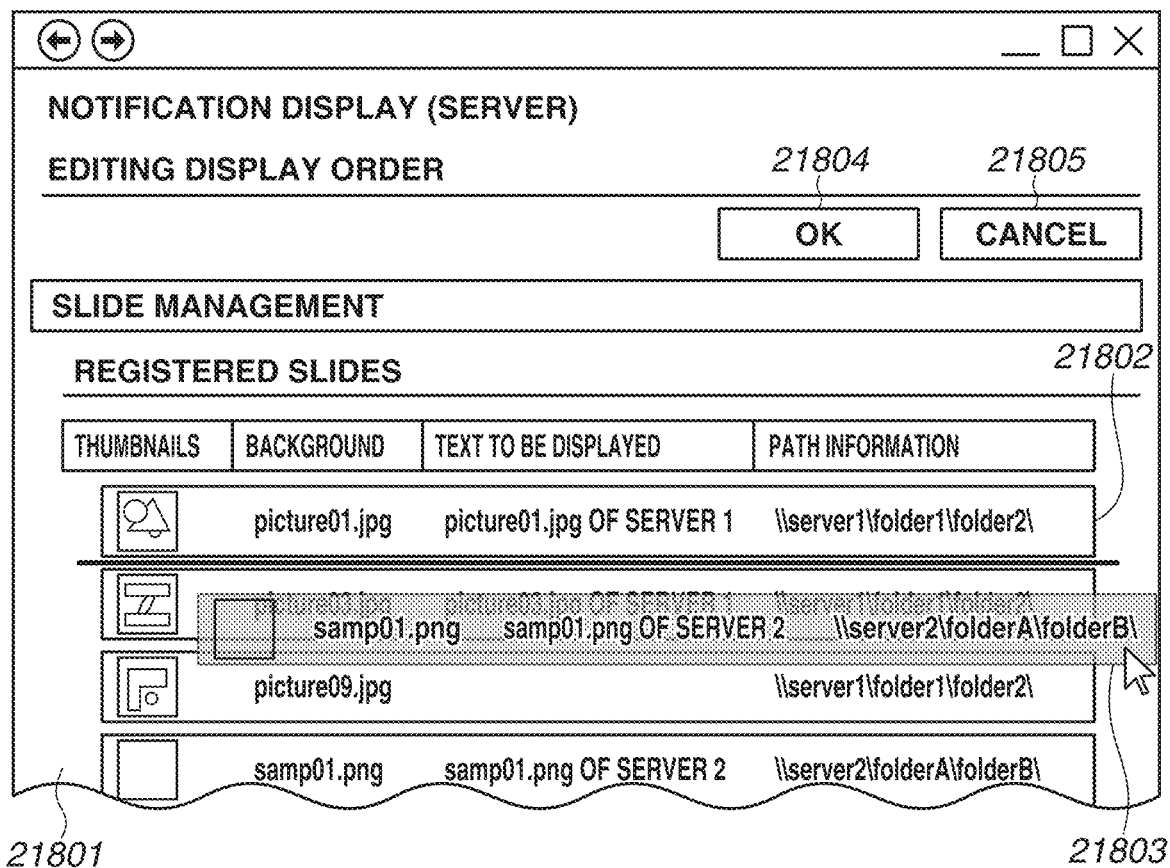
FIG. 22A illustrates an example display in the first process of the display order editing screen according to a second modification.
Figure 22B:
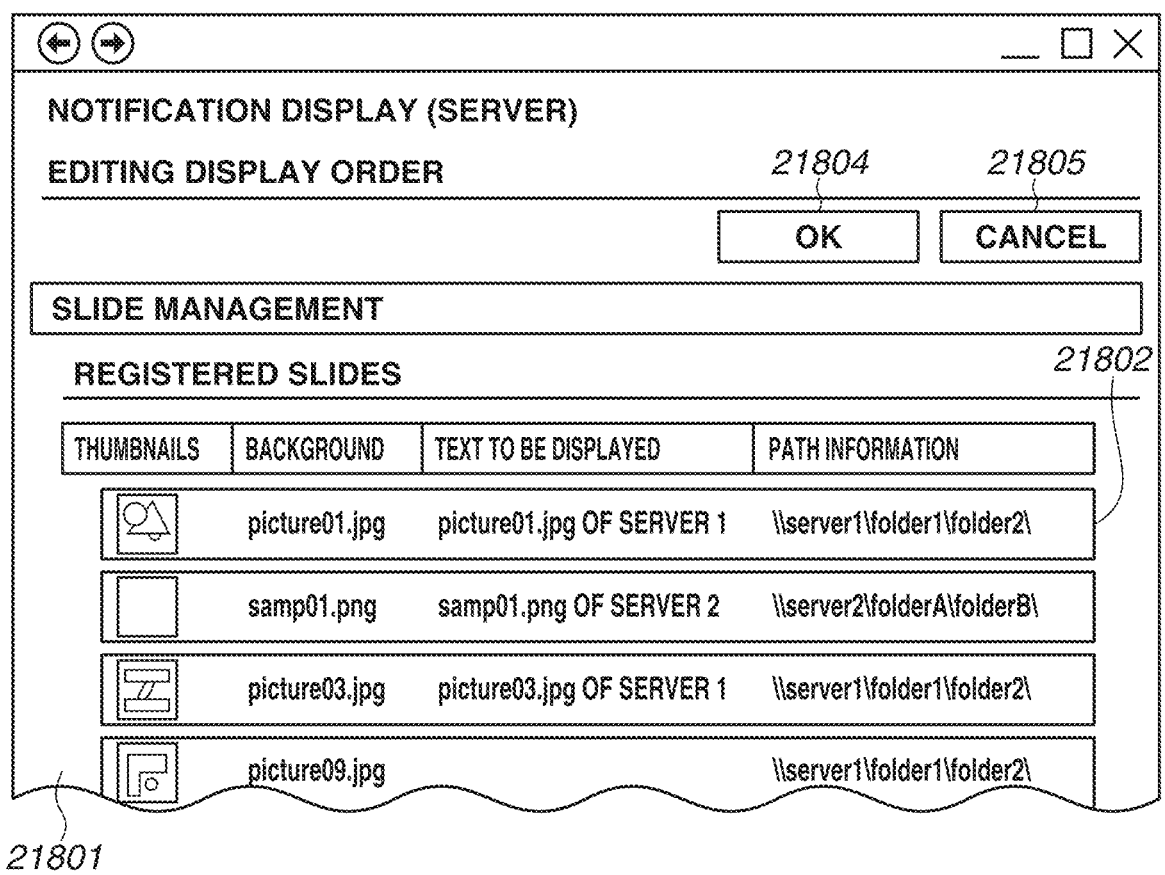
FIG. 22B illustrates an example display in the second process of the display order editing screen according to the second modification.

A second modification is configured to perform a display order change operation by moving the thumbnail of a slide with a drag-and-drop operation. FIG. 22A illustrates an example display in a first process of the display order editing screen according to the second modification. FIG. 22B illustrates an example display in a second process of the display order editing screen according to the second modification.

A display order editing screen 21801 includes a thumbnail display area 21802. The thumbnail display area 21802 is a thumbnail list that displays a list of thumbnail images of slides. These thumbnail images are displayed by acquiring image files from an image file path or an image file URL specified by the File Location option 603 and then caching them as thumbnail images. The display order is changed when the user selects the thumbnail of a slide to be subjected to display order change from the thumbnail display area 21802, moves the thumbnail to the position of the desired display order with a drag-and-drop operation 21803, and then presses an OK button 21804. When the user presses a Cancel button 21805, the CPU 101 cancels information about the display order changed by the drag-and-drop operation 21803 and then displays the top screen 401 of setting screens of the extended application 310.

Remarks

The above-described configuration enables collecting image data existing in a plurality of locations from a preset path and displaying the image data. As described above, the present exemplary embodiment makes it possible to register paths of images existing in a plurality of locations as targets of a slide show, and then perform a display order change operation. This method excels in usability because the user does not need to be conscious of the display order when registering the image path, allowing the user to change the display order with an intuitive operation such as a drag-and-drop operation. The method also enables displaying thumbnails of images that can be currently acquired indicated by the image path, making it easier to grasp the current display order of slides.

The first present exemplary embodiment has been described above centering on an example where image data existing in a plurality of locations are collected from a preset path and normally displayed. However, in this configuration for acquiring images from a plurality of locations via a network, there may arise a situation where some of the plurality of images cannot be accessed. A second exemplary embodiment will be described below centering on a case of suitably processing the slide corresponding to an unacquirable image in a case where image data existing in a plurality of locations is acquired via a network to provide a slide show. The second exemplary embodiment can provide a display apparatus capable of suitably process the slide corresponding to an unacquirable image in a case where image data existing in a plurality of locations is successively displayed and acquired via a network to provide a slide show. The configuration of the second exemplary embodiment is approximately the same as the configuration of the first exemplary embodiment except for characterizing portions. Therefore, in the following descriptions, identical components are assigned the same reference numerals, and detailed descriptions thereof may be omitted.

<Setting Screens>

FIG. 24 illustrates the basic setting editing screen illustrated in FIG. 5 and a Slide Image Error Handling Method option. A basic setting editing screen 30501 includes a Button Name option 30502, an automatic application start setting ("Automatically Make Transition") option 30503, a "Display Time for One Slide" option 30504, a Slide Specification Method option 30505, the OK button 506, and the Cancel button 507. The above-described configuration corresponds to the options 501 to 505 and the buttons 506 and 507 in FIG. 5. A Slide Image Error Handling Method option 30508 is an option for selecting the slide display processing method in a case where a normal image cannot be downloaded from a server based on information set in a slide.

An Alternative Image Selection Method option 30509 is an option for selecting an image to be displayed when alternative image display is selected for the Slide Image Error Handling Method option 30508. When "Use Default Image" is selected, an image incorporated in the extended application 310 is used. When "Use Registered Image" is selected, an image registered by an "Register Alternative Image" option 30510 by the user is used. The "Register Alternative Image" option 30510 is an option for registering an image stored in the user's local environment to a device. When the user checks a "Register Alternative Image" button and then presses a "Refer To" button, files in the user's local environment are registered.

<Image Data Acquisition Processing>

Processing for acquiring slide show image data will be described below with reference to FIG. 31. This processing is part of processing for configuring the slide show application installed in the extended application 310. The VM/FW unit 309 interprets the script language describing the relevant processing, and the CPU 101 executes the script language via the VM/FW unit 309.

In step S321-001, the CPU 101 determines whether "Collectively Specify Slides from Folder" is selected for the Slide Specification Method option 505. When "Collectively Specify Slides from Folder" is selected for the Slide Specification Method option 505 illustrated in FIG. 5 (YES in step S321-001), the processing proceeds to step S321-002. On the other hand, when "Specify Slide One by One" is selected (NO in step S321-001), the processing proceeds to step S321-003.

In step S321-002, the CPU 101 identifies target image files and determines the display order based on the setting of the "Display Order of Files in Folder" option 905 illustrated in FIG. 9.

In step S321-003, the CPU 101 once disables the cache state of the image data prestored in a cache area 2100.

In step S321-004, the CPU 101 sets the index i to 1. Then, the processing proceeds to the next step. The index i indicates the display order. Setting the index i to 1 means indicating the first image.

In step S321-005, the CPU 101 determines whether the i-th image needs to be cached. This determination is equivalent to the sequence in step S14-040 illustrated in FIG. 14. More specifically, the CPU 101 compares the image meta information received in step S14-030 and the image meta information prestored in the cache area 2100 to confirm whether the image meta information has been updated. When the date and time of update of the received image meta information is later than the date and time of update of the prestored image meta information, the CPU 101 determines that the image meta information has been updated. Alternatively, when the size of the received image meta information is different from the size of the prestored image meta information, the CPU 101 determines that the image meta information has been updated. In addition, when the relevant image meta information is not prestored in the cache area 2100, the CPU 101 determines that the image meta information has been updated. When the CPU 101 determines that the image meta information has not been updated (NO in step S321-005), the processing proceeds to step S321-006. On the other hand, when the CPU 101 determines that the image meta information has been updated (YES in step S321-005), the processing proceeds to step S321-007.

In step S321-006, the CPU 101 enables the cache state of the i-th image once disabled in step S321-003. Then, the processing proceeds to step S321-012.

In step S321-007, the CPU 101 determines whether a path or URL is selected for the Background option 602 illustrated in FIG. 6. When a path is specified ("Specify Image with Path" is selected) (smb in step S321-007), the CPU 101 determines that access based on the SMB protocol will be used. Then, the processing proceeds to step S321-008. On the other hand, when a URL is specified ("Specify Image with URL" is selected) (http in step S321-007), the CPU 101 determines that access based on the http protocol will be used. Then, the processing proceeds to step S321-009.

In step S321-008, the CPU 101 acquires the i-th image data from the path specified by the File Location option 603 illustrated in FIG. 6, by using the SMB protocol. The CPU 101 also requests the SMB authentication based on the authentication information set by the User Name option 604 and the Password option 605. Upon completion of the acquisition processing, the processing proceeds to step S321-010.

In step S321-009, the CPU 101 acquires the i-th image data from the URL specified by the File Location option 603 illustrated in FIG. 6, by using the http protocol. Upon completion of the acquisition processing, the processing proceeds to step S321-010.

In step S321-010, the CPU 101 confirms whether the image data has been normally acquired. If a network error, an SMB ID/PASSWORD authentication error, or an invalid image data format error occurs, the acquisition processing is determined to be failed. When the image data acquisition is successful (YES in step S321-010), the processing proceeds to step S321-011. On the other hand, when the image data acquisition fails (NO in step S321-010), the processing proceeds to step S321-014.

In step S321-014, the CPU 101 increments the number of retries by one. Then, the processing proceeds to step S321-015.

In step S321-015, the CPU 101 confirms whether the number of retries is equal to or less than a predetermined value. When the number of retries is equal to or less than the predetermined value (YES in step S321-015), the processing returns to step S321-007. Then, the CPU 101 performs image data retry processing. On the other hand, when the number of retries exceeds the predetermined value (NO in step S321-015), the CPU 101 cancels the current slide image data acquisition. Then, the processing proceeds to step S321-012.

In step S321-011, the CPU 101 stores the acquired i-th image data in the cache area 2100. At the same time, the CPU 101 updates the image meta information for the i-th image data to the acquired information and enables the cache state of the i-th image.

In step S321-012, the CPU 101 increments the index i by one.

In step S321-013, the CPU 101 determines whether the request for displaying the i-th image indicated by the incremented index i is present. When the request for displaying the i-th image is present (YES in step S321-013), the processing returns to step S321-005. On the other hand, when the request is not present (NO in step S321-013), the CPU 101 ends the image data acquisition processing.

<Management Data>

FIG. 26 illustrates an example of meta information stored in the meta information storage operation in step S14-130 in FIG. 14. This meta information includes information columns 316-01 to 316-04. The information column 316-01 manages information about the protocol for each image. The information column 316-02 manages information about the path for each image. The information column 316-03 manages information about the size of each image acquired from a server. The information column 316-04 manages information about the date and time of update for each image acquired from the server. More specifically, the meta information for "\\server1\dir1\path\image1.jpg" with the SMB protocol includes the size "10000" and the date and time of update "Jan. 1, 2021".

FIG. 25 illustrates an example of slide setting information stored in the setting storage operation in step S12-050 in FIG. 12. In this example, four different slides are registered. The slide setting information includes information columns 315-01 to 315-04. The information column 315-01 manages information about the slide number. The information column 315-02 manages information about the text string to be displayed in each slide. The information column 315-03 manages information about the protocol used to access each image to be displayed in each slide. The information column 315-04 manages information about the image path used to access each image to be displayed in each slide. More specifically, the first slide displays a text string "test1", downloads the image "\\server1\dir1\path\image1.jpg" based on the SMB protocol, and displays the image. Information for four different slides is registered in this way. Although, in this example, the same protocol is used for all images, a different protocol may be used for each slide.

Note that the meta information in FIG. 26 stores three different meta information pieces while the slide setting information in FIG. 25 stores four different slide information pieces. The meta information in FIG. 26 stores meta information for combinations of the protocol and the image path while the slide setting information in FIG. 25 stores information for each slide. Therefore, even when slides 1 and 4 refer to the same image, the slide setting information stores four information pieces.

<Text Combination>

Figure 27:
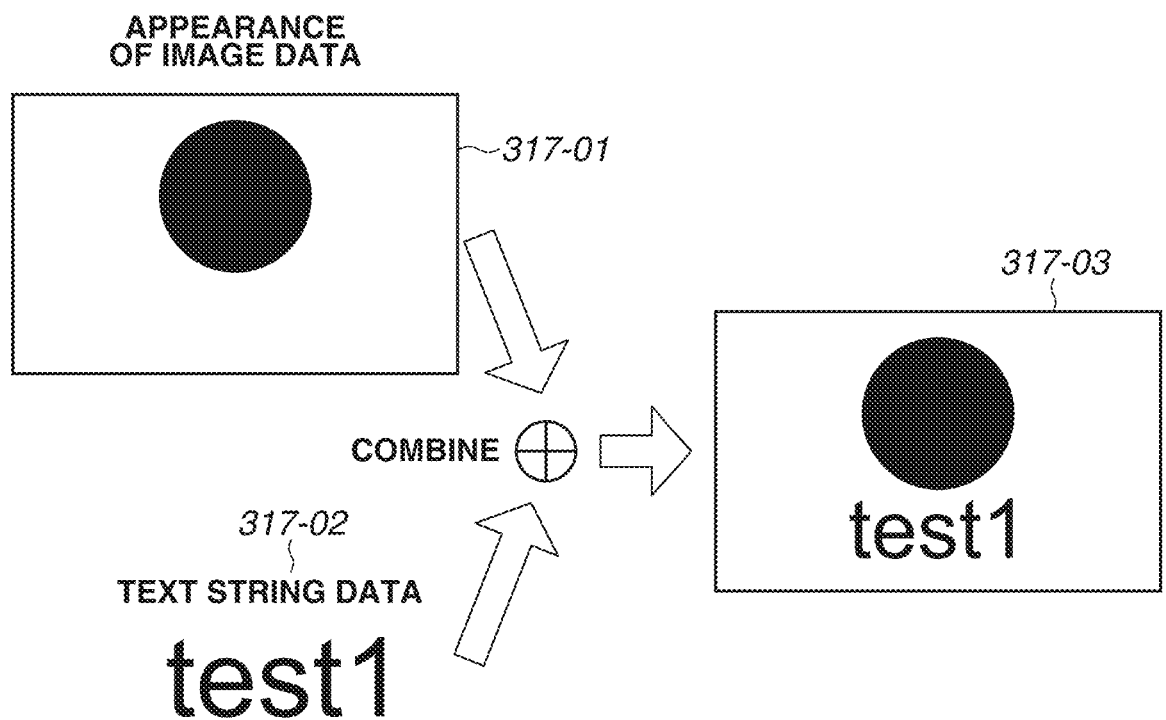
FIG. 27 illustrates an example of slide combination.

When providing a slide show, the second exemplary embodiment enables appending information such as a text to an image. FIG. 27 illustrates an example configuration for combining slide images based on information registered in the slide setting information. An image 317-01 indicates the appearance of the image data registered in a slide. Information 317-02 indicates text string data registered in a slide.

When text combination setting has been performed in advance, combining the appearance of the image data of the image 317-01 and the text string data of the information 317-02 generates an image 317-03 to be used for slide display.

<Error Handling>

According to the present exemplary embodiment, display error handling processing is performed if a target image for a slide show cannot be obtained. FIG. 28 illustrates an example of slide combination in a case where the appearance of the image data cannot be drawn. The present exemplary embodiment is configured to acquire image data from a server. At the time of image data acquisition, image data may not be normally acquired because of the influences of setting changes on the server side.

If the normal image data acquisition fails, the appearance of the image data cannot be drawn, and slide images to be displayed cannot be combined. In such a case, error handling processing is used in the slide image display processing. There is a plurality of error handling methods, as illustrated in FIG. 5. The present exemplary embodiment enables the user to select a desired error handling method from a plurality of error handling methods according to the user's preference. A first error handling method corresponds to "Do Not Display Slide". This method skips the playback of the slide with an image data acquisition failure. A second error handling method corresponds to "Display Only Text String". As illustrated in an image 318-01, this method displays only the registered text string in the slide without drawing the appearance of the image data that has not be able to be acquired. A third error handling method corresponds to "Display Alternative Image and Text String". As illustrated in an image 318-02, this method combines image data indicating that the appearance of the image data cannot be drawn and the registered text string, and displays the combination as a slide. A fourth error handling method corresponds to "Display Only Alternative Image". As illustrated in an image 318-03, this method displays only image data (alternative image data) indicating that the appearance of the image data cannot be drawn. A fifth error handling method corresponds to "Display Blank". As illustrated in an image 318-04, this method displays neither image data nor text string data (text string data or text data for combination) but displays a blank. The error handling method to be used may be collectively specified for the entire slide show or specified for each individual slide. A predetermined error handling method may be specified without prompting the user to specify a method.

Figure 29:
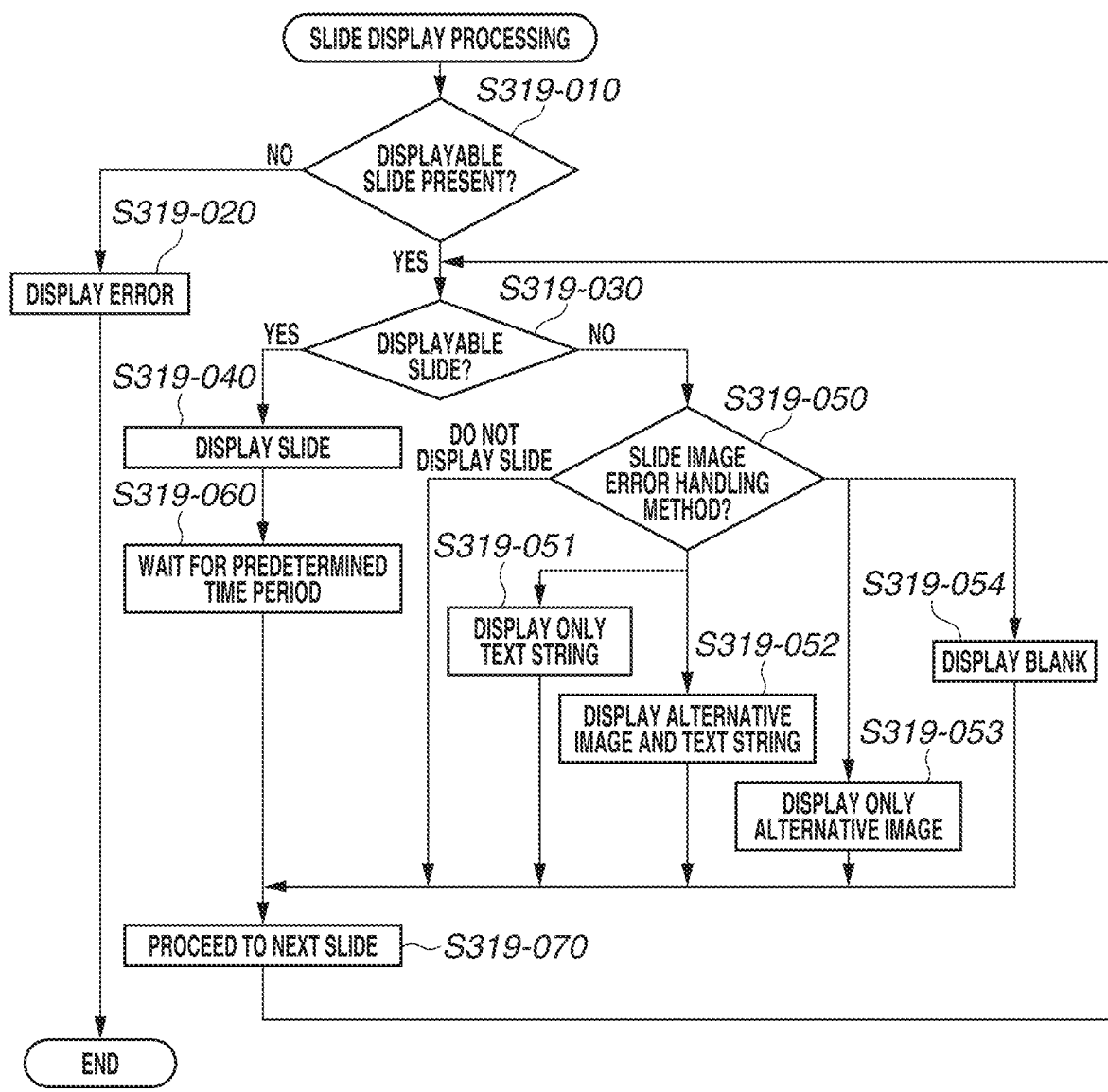
FIG. 29 is a flowchart illustrating slide display processing.

FIG. 29 illustrates details of the slide display processing in step S14-140 in FIG. 14.

In step S319-010, the CPU 101 confirms whether there is a normally displayable slide in the image information set in the slide setting information. For example, if image downloading from a server fails, slide display cannot be performed in the failed state. In this case, the CPU 101 confirms whether at least one normally displayable slide is present.

When at least one displayable slide is present (YES in step S319-010), the processing proceeds to step S319-030. On the other hand, when no displayable slide is present (NO in step S319-010), the processing proceeds to step S319-020.

Figure 30:
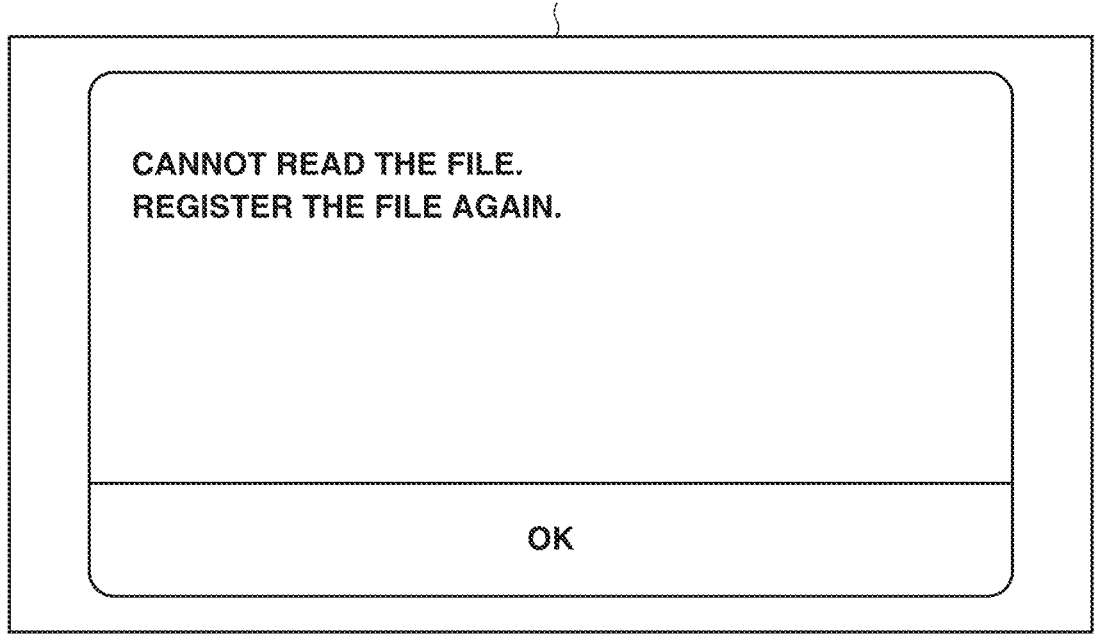
FIG. 30 illustrates an example of an error screen configuration.

In step S319-020, the CPU 101 displays an error screen 320-00 in FIG. 30 indicating that no displayable slide is present and then ends the extended application 310.

In step S319-030, the CPU 101 confirms whether each individual slide is a displayable slide. When each individual slide is a displayable slide (YES in step S319-030), the processing proceeds to step S319-040. On the other hand, when each individual slide is not a displayable slide (NO in step S319-030), the processing proceeds to step S319-050.

In step S319-040, the CPU 101 displays the slide after the image combination illustrated in FIG. 27. Then, the processing proceeds to step S319-060.

In step S319-060, the CPU 101 waits for a predetermined time period. Then, the processing proceeds to step S319-070.

In step S319-050, the processing proceeds to one of steps S319-051 to S319-054 and S319-070 according to the setting of the Slide Image Error Handling Method option 30508 in FIG. 24.

In steps S319-051 to S319-054, the CPU 101 performs the error handling processing set by the Slide Image Error Handling Method option 30508. Then, the processing proceeds to step S319-070.

In step S319-070, the CPU 101 proceeds to the next slide. Then, the processing returns to step S319-030.

Performing the above-described control enables displaying an error message reflecting the user's intention if an image cannot be normally acquired.

Other Exemplary Embodiments

The present disclosure is applicable to a system composed of a plurality of apparatuses and to an apparatus composed of one apparatus. For example, functions may be implemented by configuring some software modules to be executed by an external server and acquiring a result of processing performed by the external server. For example, a storage unit for storing data may be disposed in the external server.

The present disclosure is not limited to the above-described exemplary embodiments but can be modified in diverse ways (including organic combinations of these exemplary embodiments) without departing from the spirit and scope thereof. These modifications are not excluded from the scope of the present disclosure. More specifically, all of configurations derived by suitably combining the above-described exemplary embodiments and modifications thereof are also intended to be included in the present disclosure.

The above-described exemplary embodiments are configured to provide a slide show application as an extended application. However, the effects of the present disclosure can also be reliably obtained by configuring the slide show application not as an extended application but as a part of the main program which is embedded software.

The above-described exemplary embodiments are configured to support two different protocols (SMB and http). However, the supported protocols are not limited thereto. For example, the present exemplary embodiment may also be configured to support the WebDav protocol. Alternatively, the present exemplary embodiment may be configured to store path information for external storages attachable to and detachable from the display apparatus, such as a USB memory and a Secure Digital (SD) card that can be stored in the display apparatus, and an internal storage (built-in storage) such as the eMMC 109. Thus, image data can be collected from a wide range of path and then displayed. On the contrary, similar effects can be obtained even if the present exemplary embodiment is configured to support only the SMB protocol.

According to the above-described exemplary embodiments, user authentication information used to access a folder with the SMB protocol can be (individually) stored (maintained) in combination with the network path settings. However, for example, by supporting only a URL accessible by the http protocol not needing user identification, similar effects can be obtained even without storing the user authentication information in combination with the network path settings.

According to the above-described exemplary embodiments, a text string preset by the "Display Text on Slide" option 607 and the "Text to Be Displayed" option 608 illustrated in FIG. 6 is superimposed on the displayed image. However, effects of the present disclosure can be obtained even without text string superposition.

According to the above-described exemplary embodiments, not only an image acquired from a pre-registered network path but also a screen with a specified background color can be displayed. However, the background color display is not essential to the present disclosure. Similar effects can be obtained even without this function.

According to the described exemplary embodiments, "Collectively Specify Slides from Folder" or "Specify Slides One by One" can be selected for the Slide Specification Method option 505 illustrated in FIG. 5. However, "Collectively Specify Slides from Folder" is not essential to the present disclosure. Similar effects can be obtained even without this function. On the contrary, effects different from those of the present disclosure can be obtained by expanding the setting items for "Collectively Specify Slides from Folder". For example, "In Order of File Name" or "In Order of Date and Time of Update" can be selected for the "Display Order of Files in Folder" option 905 illustrated in FIG. 9. Finer display settings can be provided by adding "In Size Order" and enabling selection of the ascending or descending order.

A mechanism is known to deliver application setting values as a known technique that is totally different from the present disclosure. Applying this technique enables sharing (replicating) one setting of the slide show application of the present disclosure among a plurality of display apparatuses. This configuration makes it possible to display an identical image on a plurality of display apparatuses even without preparing a distribution server like a digital signage described above in the background of the disclosure. The present disclosure may be combined with such a technique. With this combination, for example, replacing image data on an SMB server with the same file name enables collectively changing the contents of a slide show performed on a plurality of display apparatuses without changing the network path registered in the plurality of display apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2021-187836, filed Nov. 18, 2021, No. 2021-200578, filed Dec. 10, 2021, No. 2021-200581, filed Dec. 10, 2021, and No. 2022-122645, filed Aug. 1, 2022, which are hereby incorporated by reference herein in their entirety.

What is claimed is:

1. An image forming apparatus including a display unit and capable of executing a plurality of functions including a copy function, the display unit being configured to display an image acquired via a network, the image forming apparatus comprising:
one or more controllers configured to:
execute the copy function and a function of displaying a plurality of images one after another as a slide show by a virtual machine;
register a plurality of pieces of address information from a plurality of locations on the network including address information for image data accessible with a first protocol and address information for image data accessible with a second protocol, the plurality of pieces of address information being used for performing display as the slide show;
perform image data acquisition processing with the one or more controllers to acquire a plurality of pieces of image data from the plurality of locations on the network based on the plurality of pieces of registered address information when the function as a slide show is activated; and
perform image data display processing with the one or more controllers to sequentially display the plurality of pieces of acquired image data as a as the slide show on the display unit.

2. The image forming apparatus according to claim 1, wherein the first protocol is a Server Message Block (SMB) protocol and the second protocol is a hypertext transfer protocol (http).

3. The image forming apparatus according to claim 1, wherein user authentication information for accessing each piece of image data indicated by the plurality of pieces of address information is individually stored in association with the plurality of pieces of address information.

4. The image forming apparatus according to claim 1, wherein, as the plurality of pieces of address information, a path of a storage built in the image forming apparatus or a path of a storage attachable to and detachable from the image forming apparatus can be registered.

5. The image forming apparatus according to claim 1, wherein the one or more controllers are further configured to provide a web page for registering a plurality of pieces of address information.

6. The image forming apparatus according to claim 1, wherein the plurality of pieces of address information includes at least a network path conforming to the first protocol and a network path conforming to the second protocol.

7. The image forming apparatus according to claim 1, wherein the one or more controllers are further configured to set display order information of the image data for the plurality of pieces of registered address information.

8. The image forming apparatus according to claim 7, wherein the one or more controllers are further configured to provide a web page for setting the display order information.

9. The image forming apparatus according to claim 8, wherein the web page for setting the display order information disposes a list of the plurality of pieces of registered address information.

10. The image forming apparatus according to claim 9, wherein the display order information is changed by an operation on a button disposed on the web page.

11. The image forming apparatus according to claim 9, wherein the display order information is changed by a drag-and-drop operation on the list of the plurality of pieces of registered address information.

12. The image forming apparatus according to claim 8, wherein the web page for setting the display order information includes a list of thumbnails corresponding to the plurality of pieces of registered address information.

13. The image forming apparatus according to claim 12, wherein the display order information is changed by a drag-and-drop operation on the list of thumbnails.

14. The image forming apparatus according to claim 1, wherein the one or more controllers are further configured to accept a specification of a text string to be superimposed on an image corresponding to the plurality of pieces of registered address information.

15. The image forming apparatus according to claim 1, further comprising an image forming apparatus that forms an image on a sheet.

16. The image forming apparatus according to claim 1, further comprising an image reading apparatus that reads a document.

17. The image forming apparatus according to claim 1, wherein the plurality of locations are servers which are different from one another.

18. The image forming apparatus according to claim 1, further comprising a printing unit configured to execute a printing operation.

19. The image forming apparatus according to claim 1, further comprising a scanner unit configured to execute a scanning operation.

20. The image forming apparatus according to claim 1, wherein the one or more controllers display, on the display unit, a button corresponding to the copy function and a button corresponding to the function of performing display as the slide show.

21. The image forming apparatus according to claim 20, wherein the one or more controllers display, on the display unit, the slide show when the button corresponding to the function of performing display as the slide show is pressed down.

22. A control method for controlling an image forming apparatus, the image forming apparatus including a display unit and capable of executing a plurality of functions including a copy function, the display unit being configured to display an image acquired via a network, the control method comprising:
  executing the copy function and a function of displaying a plurality of images one after another as a slide show by a virtual machine;
  registering a plurality of pieces of address information from a plurality of locations on a network, the address information including address information for image data accessible with a first protocol and address information for image data accessible with a second protocol, the plurality of pieces of address information being used for performing display as the slide show;
  performing image data acquisition processing for acquiring a plurality of pieces of image data from the plurality of locations on the network based on the plurality of pieces of registered address information when the function as a slide show is activated; and
  performing image data display processing with the one or more controllers to sequentially display the plurality of pieces of acquired image data as a as the slide show on the display unit.

23. A non-transitory computer-readable storage medium storing a program for executing a method for controlling an image forming apparatus, the image forming apparatus including a display unit and capable of executing a plurality of functions including a copy function, the display unit being configured to display an image acquired via a network, the method comprising:
  executing the copy function and a function of displaying a plurality of images one after another as a slide show by a virtual machine;
  registering a plurality of pieces of address information including address information for image data accessible with a first protocol and address information for image data accessible with a second protocol from a plurality of locations on a network, the plurality of pieces of address information being used for performing display as the slide show;
  performing image data acquisition processing through the one or more controllers for acquiring a plurality of pieces of image data from the plurality of locations on the network based on the plurality of pieces of registered address information when the function as a slide show is activated; and
  performing image data display processing with the one or more controllers to sequentially display the plurality of pieces of acquired image data as the slide show on the display unit.

24. An image forming apparatus including a display unit and capable of executing a plurality of functions including a copy function, the display unit being configured to display an image acquired via a network, the image forming apparatus comprising:
  one or more controllers configured to:
  execute the copy function and a function of displaying a plurality of images one after another as a slide show by a virtual machine;
  register a plurality of pieces of address information indicating acquisition destinations of a plurality of pieces of image data from a plurality of locations on the network, the plurality of pieces of address information being used for performing display as the slide show;
  perform image data acquisition processing through the one or more controllers for acquiring the plurality of pieces of image data from the plurality of locations on the network based on the plurality of pieces of address information when the function as a slide show is activated; and
  perform image data display processing with the one or more controllers to sequentially display, on the display unit, the plurality of pieces of acquired image data as the slide show with a slide with successful image data acquisition based on the address information, and the slide with failed image data acquisition based on the address information, the slide including predetermined information.

* * * * *